United States Patent
Geng et al.

(10) Patent No.: US 12,328,660 B2
(45) Date of Patent: Jun. 10, 2025

(54) COMMUNICATIONS METHOD, APPARATUS, AND SYSTEM

(71) Applicant: Huawei Technologies Co., Ltd., Shenzhen (CN)

(72) Inventors: Tingting Geng, Shanghai (CN); Hongping Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 673 days.

(21) Appl. No.: 17/511,992

(22) Filed: Oct. 27, 2021

(65) Prior Publication Data
US 2022/0078698 A1    Mar. 10, 2022

Related U.S. Application Data

(63) Continuation of application No. PCT/CN2020/084737, filed on Apr. 14, 2020.

(30) Foreign Application Priority Data

Apr. 28, 2019   (CN) .................... 201910351204.2

(51) Int. Cl.
*H04W 48/06*   (2009.01)
*H04W 28/08*   (2023.01)
*H04W 84/04*   (2009.01)

(52) U.S. Cl.
CPC ....... *H04W 48/06* (2013.01); *H04W 28/0846* (2020.05); *H04W 84/042* (2013.01)

(58) Field of Classification Search
CPC ............ H04W 48/06; H04W 28/0846; H04W 84/042
See application file for complete search history.

(56) References Cited

U.S. PATENT DOCUMENTS

| 2011/0171926 A1* | 7/2011 | Faccin .................. H04W 48/18 455/404.1 |
| 2018/0109992 A1* | 4/2018 | Lee .................... H04W 28/0268 |
| 2018/0199273 A1  | 7/2018 | Chun |
| 2019/0082376 A1  | 3/2019 | Hong et al. |

FOREIGN PATENT DOCUMENTS

| CN | 109151950 A | 1/2019 |
| CN | 109219111 A | 1/2019 |

(Continued)

OTHER PUBLICATIONS

Vivo, "Solution for accessing to Non Public Network services via PLMN", SA WG2 Meeting #129, S2-1810200, Oct. 15-19, 2018, 6 pages, Dongguan, P.R. China.

(Continued)

*Primary Examiner* — Brenda H Pham
(74) *Attorney, Agent, or Firm* — Slater Matsil, LLP

(57) ABSTRACT

Embodiments of this application provide a communications method, apparatus, and system. The method includes: A terminal device receives first information sent by a network device, where the first information includes access control information of services with N service attributes, and N is an integer greater than or equal to 1; and the terminal device determines, based on a first service that currently needs to be initiated and the first information, whether the terminal device can initiate the first service, where the N service attributes include at least a non-public network service, and the first service is any one of the services with the N service attributes. Therefore, access control on the terminal device is implemented when there is a non-public network service.

20 Claims, 9 Drawing Sheets

(56) References Cited

FOREIGN PATENT DOCUMENTS

| CN | 109327882 A | 2/2019 |
|---|---|---|
| CN | 109379760 A | 2/2019 |
| WO | 2018203263 A1 | 11/2018 |

OTHER PUBLICATIONS

LG Electronics et al., "Clarification on PLMN selection for non public network", 3GPP TSG-Sa WG1 Meeting #85 S1-190217, Feb. 18-22, 2019, 9 pages, Tallinn, Estonia.

OPPO, "Unified access control for access control of SNPN and CAG capable UEs", 3GPP TSG-SA WG2 Meeting #132, S2-1903487, Apr. 8-Apr. 12, 2019, 3 pages, Xi'an, (China).

Qualcomm Incorporated, "Clarifications and evaluation of solution 20 (PLMN/NPN service access)", SA WG2 Meeting #129bis, S2-1811656, Nov. 26-30, 2018, 8 pages, West Palm Beach, Florida.

3rd Generation Partnership Project, Technical Specification Group Core Network and Terminals, Non-Access-Stratum (NAS) protocol for 5G System (5GS), Stage 3 (Release 15), 3GPP TS 24.501 V15.3.0 (Mar. 2019), 470 pages.

3rd Generation Partnership Project, Technical Specification Group Radio Access Network, NR, Radio Resource Control (RRC) protocol specification (Release 15), 3GPP TS 38.331 V15.5.1 (Apr. 2019), 491 pages.

OPPO, "Unified access control for access control of SNPN and CAG capable UEs", 3GPP TSG-SA WG2 Meeting #132, S2-1903487, Apr. 8, 12 Apr. 2019, 3 pages, Xi'an (China).

\* cited by examiner

COMMUNICATIONS METHOD, APPARATUS, AND SYSTEM

CROSS-REFERENCE TO RELATED APPLICATIONS

This application is a continuation of International Application No. PCT/CN2020/084737, filed on Apr. 14, 2020, which claims priority to Chinese Patent Application No. 201910351204.2, filed on Apr. 28, 2019. The disclosures of the aforementioned applications are hereby incorporated by reference in their entireties.

TECHNICAL FIELD

Embodiments of this application relate to the field of communications technologies, and in particular, to a communications method, apparatus, and system.

BACKGROUND

Currently, a non-public network (NPN) is proposed during communications technology development. Compared with a public network, the non-public network may be understood as a private network, for example, an internal network established by a company, a school, or a factory. A terminal device that is not subscribed to the non-public network is not allowed to access the non-public network. There are two types of non-public networks: a non-standalone non-public network (NSNPN) and stand-alone non-public network (SNPN). The NSNPN uses a part of a network resource of the public network. A public land mobile network identifier (Public Land Mobile Network identification, PLMN ID) of the NSNPN is consistent with that of a public network that the NSNPN is attached to. This type of non-public network is referred to as a closed access group (CAG) and is identified by using a CAG ID. The SNPN is a non-public network that does not depend on network functions of the public network. According to an existing communication protocol, a mobile country code (MCC) of a PLMN ID of the SNPN is 999, but a mobile net code (MNC) is not defined and is identified by using an NPN ID. Because service interworking may be implemented between the non-public network and the public network, the following types of services may exist: a non-public network service directly supported by the public network, a public network service directly supported by the non-public network, a non-public network service supported by the public network by using a non-3GPP interworking function (N3IWF), and a public network service supported by the non-public network by using the N3IWF.

To ensure communication quality of service, a network performs access control, that is, user access control (UAC), on a terminal device based on factors such as a base station load. Existing UAC is performing access control based on a PLMN ID, in other words, a network performs different access control management on terminal devices with different PLMN IDs. For example, if a small operator A (PLMN 1) rents a base station of a large operator B (PLMN 2), the large operator may formulate a corresponding UAC mechanism to limit terminal device access of the small operator A (PLMN 1) when the base station load is relatively heavy. Consequently, in the prior art, when access control is performed on a terminal device of a public network service in a public network, an access control requirement of the terminal device cannot be met when there is a non-public network service.

SUMMARY

Embodiments of this application provide a communications method, apparatus, and system, to implement access control on a terminal device when there is a non-public network service.

According to a first aspect, an embodiment of this application provides a communications method, including: A terminal device first receives first information sent by a network device, and then determines, based on a first service that currently needs to be initiated and the first information, whether the terminal device can initiate the first service. The first information includes access control information of services with N service attributes, and N is an integer greater than or equal to 1. The N service attributes include at least a non-public network service, and the first service is any one of the services with the N service attributes. Therefore, access control on the terminal device is implemented when there is a non-public network service.

Optionally, the first information includes access control information of services with N service attributes corresponding to each of R PLMNs, where R is an integer greater than or equal to 1.

That the terminal device determines, based on a first service that currently needs to be initiated and the first information, whether the terminal device can initiate the first service includes:

The terminal device determines, based on the first service that currently needs to be initiated, a registered public land mobile network (RPLMN) of the terminal device, and the first information, whether the terminal device can initiate the first service.

Optionally, the first information includes access control information of services with N service attributes corresponding to each of R PLMNs and access control information of services with N service attributes corresponding to each of H non-public networks, where R and H are integers greater than or equal to 1.

That the terminal device determines, based on a first service that currently needs to be initiated and the first information, whether the terminal device can initiate the first service includes:

The terminal device determines, based on the first service that currently needs to be initiated, an RPLMN of the terminal device, and the first information, whether the terminal device can initiate the first service; and/or the terminal device determines, based on the first service that currently needs to be initiated, a non-public network that the terminal device currently accesses, and the first information, whether the terminal device can initiate the first service.

Optionally, the first information includes access control information of services with N service attributes simultaneously corresponding to each of R PLMNs and each of H non-public networks, where R and H are integers greater than or equal to 1.

That the terminal device determines, based on a first service that currently needs to be initiated and the first information, whether the terminal device can initiate the first service includes:

The terminal device determines, based on the first service that currently needs to be initiated, an RPLMN of the terminal device, a non-public network that the terminal device currently accesses, and the first information, whether the terminal device can initiate the first service.

Optionally, before the terminal device determines, based on the first service that currently needs to be initiated and the first information, whether the terminal device can initiate the first service, the terminal device further receives second information sent by the network device, where the second information is used to indicate whether the services with the N service attributes are supported by the network device.

That the terminal device determines, based on a first service that currently needs to be initiated and the first information, whether the terminal device can initiate the first service includes:

When the second information indicates that the first service is supported by the network device, the determine device determines, based on the first service that currently needs to be initiated and the first information, whether the terminal device can initiate the first service.

Optionally, when the second information indicates that the first service is not supported by the network device, the terminal device further determines that the terminal device cannot initiate the first service.

According to a second aspect, an embodiment of this application provides a communications method, including: A network device first generates first information, and then sends the first information to a terminal device. The first information includes access control information of services with N service attributes, and N is an integer greater than or equal to 1. The N service attributes include at least a non-public network service. Therefore, access control on the terminal device is implemented when there is a non-public network service.

Optionally, the network device further sends second information to the terminal device. The second information is used to indicate whether the services with the N service attributes are supported by the network device.

According to a third aspect, an embodiment of this application provides a communications apparatus, including a receiving module and a processing module.

The receiving module is configured to receive first information sent by a network device, where the first information includes access control information of services with N service attributes, and N is an integer greater than or equal to 1.

The processing module is configured to determine, based on a first service that currently needs to be initiated and the first information, whether a terminal device can initiate the first service.

The N service attributes include at least a non-public network service.

The first service is any one of the services with the N service attributes.

Optionally, the first information includes access control information of services with N service attributes corresponding to each of R PLMNs, where R is an integer greater than or equal to 1.

The processing module is specifically configured to determine, based on the first service that currently needs to be initiated, an RPLMN of the terminal device, and the first information, whether the terminal device can initiate the first service.

Optionally, the first information includes access control information of services with N service attributes corresponding to each of R PLMNs and access control information of services with N service attributes corresponding to each of H non-public networks, where R and H are integers greater than or equal to 1.

The processing module is specifically configured to: determine, based on the first service that currently needs to be initiated, an RPLMN of the terminal device, and the first information, whether the terminal device can initiate the first service; and/or determine, based on the first service that currently needs to be initiated, a non-public network that the terminal device currently accesses, and the first information, whether the terminal device can initiate the first service.

Optionally, the first information includes access control information of services with N service attributes simultaneously corresponding to each of R PLMNs and each of H non-public networks, where R and H are integers greater than or equal to 1.

The processing module is specifically configured to determine, based on the first service that currently needs to be initiated, an RPLMN of the terminal device, a non-public network that the terminal device currently accesses, and the first information, whether the terminal device can initiate the first service.

Optionally, before the processing module determines, based on the first service that currently needs to be initiated and the first information, whether the terminal device initiates the first service, the receiving module is further configured to receive second information sent by the network device, where the second information is used to indicate whether the services with the N service attributes are supported by the network device.

The processing module is specifically configured to: when the second information indicates that the first service is supported by the network device, determine, based on the first service that currently needs to be initiated and the first information, whether the terminal device can initiate the first service.

Optionally, the processing module is further configured to: when the second information indicates that the first service is not supported by the network device, determine that the terminal device cannot initiate the first service.

According to a fourth aspect, an embodiment of this application provides a communications apparatus, including a processing module and a sending module.

The processing module is configured to generate first information, where the first information includes access control information of services with N service attributes, and N is an integer greater than or equal to 1.

The sending module is configured to send the first information to a terminal device.

The N service attributes include at least a non-public network service.

Optionally, the sending module is further configured to send second information to the terminal device, where the second information is used to indicate whether the services with the N service attributes are supported by the network device.

According to a fifth aspect, an embodiment of this application provides a communications apparatus, including a receiver and a processor.

The receiver is configured to receive first information sent by a network device, where the first information includes access control information of services with N service attributes, and N is an integer greater than or equal to 1.

The processor is configured to determine, based on a first service that currently needs to be initiated and the first information, whether a terminal device can initiate the first service.

The N service attributes include at least a non-public network service.

The first service is any one of the services with the N service attributes.

Optionally, the first information includes access control information of services with N service attributes corresponding to each of R PLMNs, where R is an integer greater than or equal to 1.

The processor is specifically configured to determine, based on the first service that currently needs to be initiated, an RPLMN of the terminal device, and the first information, whether the terminal device can initiate the first service.

Optionally, the first information includes access control information of services with N service attributes corresponding to each of R PLMNs and access control information of services with N service attributes corresponding to each of H non-public networks, where R and H are integers greater than or equal to 1.

The processor is specifically configured to: determine, based on the first service that currently needs to be initiated, an RPLMN of the terminal device, and the first information, whether the terminal device can initiate the first service; and/or determine, based on the first service that currently needs to be initiated, a non-public network that the terminal device currently accesses, and the first information, whether the terminal device can initiate the first service.

Optionally, the first information includes access control information of services with N service attributes simultaneously corresponding to each of R PLMNs and each of H non-public networks, where R and H are integers greater than or equal to 1.

The processor is specifically configured to determine, based on the first service that currently needs to be initiated, an RPLMN of the terminal device, a non-public network that the terminal device currently accesses, and the first information, whether the terminal device can initiate the first service.

Optionally, before the processor determines, based on the first service that currently needs to be initiated and the first information, whether the terminal device initiates the first service, the receiver is further configured to receive second information sent by the network device, where the second information is used to indicate whether the services with the N service attributes are supported by the network device.

The processor is specifically configured to: when the second information indicates that the first service is supported by the network device, determine, based on the first service that currently needs to be initiated and the first information, whether the terminal device can initiate the first service.

Optionally, the processor is further configured to: when the second information indicates that the first service is not supported by the network device, determine that the terminal device cannot initiate the first service.

Optionally, the receiver and a transmitter in the communications apparatus may be integrated into a transceiver.

According to a sixth aspect, an embodiment of this application provides a communications apparatus, including a processor and a transmitter.

The processor is configured to generate first information, where the first information includes access control information of services with N service attributes, and N is an integer greater than or equal to 1.

The transmitter is configured to send the first information to a terminal device.

The N service attributes include at least a non-public network service.

Optionally, the transmitter is further configured to send second information to the terminal device, where the second information is used to indicate whether the services with the N service attributes are supported by the network device.

Optionally, the transmitter and a transceiver in the communications apparatus may be integrated into a transceiver.

With reference to the second aspect, the fourth aspect, or the sixth aspect, the following descriptions may be further provided.

Optionally, the first information includes access control information of services with N service attributes corresponding to each of R PLMNs, where R is an integer greater than or equal to 1.

Optionally, the first information includes access control information of services with N service attributes corresponding to each of R PLMNs and access control information of services with N service attributes corresponding to each of H non-public networks, where R and H are integers greater than or equal to 1.

Optionally, the first information includes access control information of services with N service attributes simultaneously corresponding to each of R PLMNs and each of H non-public networks, where R and H are integers greater than or equal to 1.

With reference to any one of the first aspect to the sixth aspect, the following descriptions may be further provided.

Optionally, the non-public network service includes at least one of the following: a non-public network service transmitted through a non-public network and a non-public network service transmitted through a public network.

Optionally, the non-public network service transmitted through the non-public network includes K access categories of non-public network services transmitted through the non-public network, where K is an integer greater than or equal to 1.

Optionally, the N service attributes further include at least one of the following: a public network service and a cross-network service.

Optionally, the public network service includes at least one of the following: a public network service transmitted through the public network and a public network service transmitted through the non-public network.

Optionally, the public network service transmitted through the public network includes M access categories of public network services transmitted through the public network, where M is an integer greater than or equal to 1.

Optionally, the cross-network service is a non-public network service transmitted through the public network or a public network service transmitted through the non-public network.

Optionally, the access control information includes an access percentage of the terminal device, barring time of the terminal device, and an access identity of the terminal device.

According to a seventh aspect, an embodiment of this application provides a communications apparatus, including: a module, a component, or a circuit configured to implement the communications method according to the first aspect; or a module, a component, or a circuit configured to implement the communications method according to the second aspect.

According to an eighth aspect, an embodiment of this application provides a chip, including a memory and a processor. The memory is configured to store a program instruction. The processor is configured to invoke the program instruction in the memory to perform the communications method according to the embodiment of this application in the first aspect or the second aspect.

According to a ninth aspect, an embodiment of this application provides a readable storage medium. The readable storage medium stores a computer program. When the computer program is executed, the communications method according to the embodiment of this application in the first aspect or the second aspect is implemented.

According to a tenth aspect, an embodiment of this application provides a program product. The program product includes a computer program. The computer program is stored in a readable storage medium. At least one processor in a communications apparatus may read the computer program from the readable storage medium. The at least one processor executes the computer program, so that the communications apparatus is enabled to implement the communications method according to the embodiment of this application in the first aspect or the second aspect.

According to an eleventh aspect, an embodiment of this application provides a communications system, including the foregoing terminal device and network device.

DETAILED DESCRIPTION OF ILLUSTRATIVE EMBODIMENTS

Figure 1:
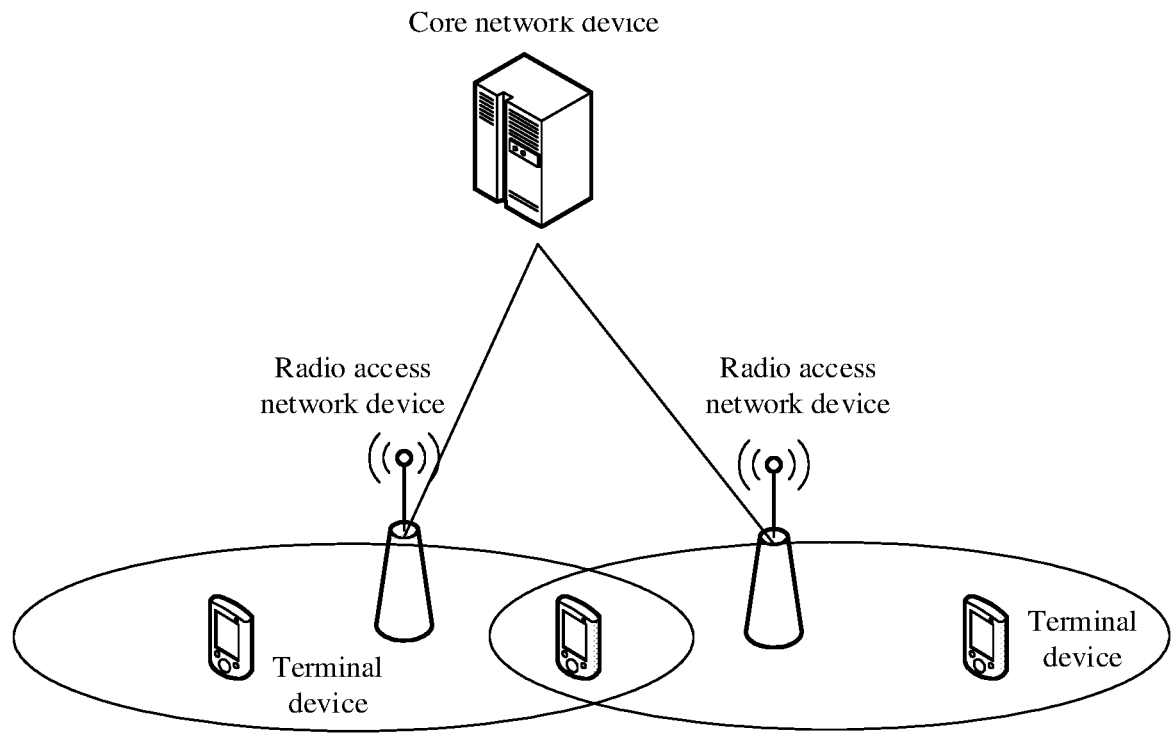
FIG. 1 is a schematic diagram of a communications system according to an embodiment of this application.

FIG. 1 is a schematic diagram of a communications system according to an embodiment of this application. As shown in FIG. 1, the communications system includes a network device and a terminal device, and the network device may include a radio access network device and a core network device. The terminal device is connected to the radio access network device in a wireless manner, and the radio access network device is connected to the core network device in a wireless or wired manner. The core network device and the radio access network device may be different independent physical devices, or functions of the core network device and logical functions of the radio access network device may be integrated into one physical device, or some functions of the core network device and some functions of the radio access network device may be integrated into one physical device. The terminal device may be located at a fixed location, or may be mobile. FIG. 1 is merely a schematic diagram. The communications system may further include another network device, for example, may further include a wireless relay device and a wireless backhaul device, which are not shown in FIG. 1. Quantities of core network devices, radio access network devices, and terminal devices included in the communications system are not limited in this embodiment of this application. It should be noted that two radio access network devices shown in FIG. 1 may be connected to a same core network device, or may be connected to different core network devices.

Some terms in this application are explained below, to help a person skilled in the art have a better understanding.

Figure 2:
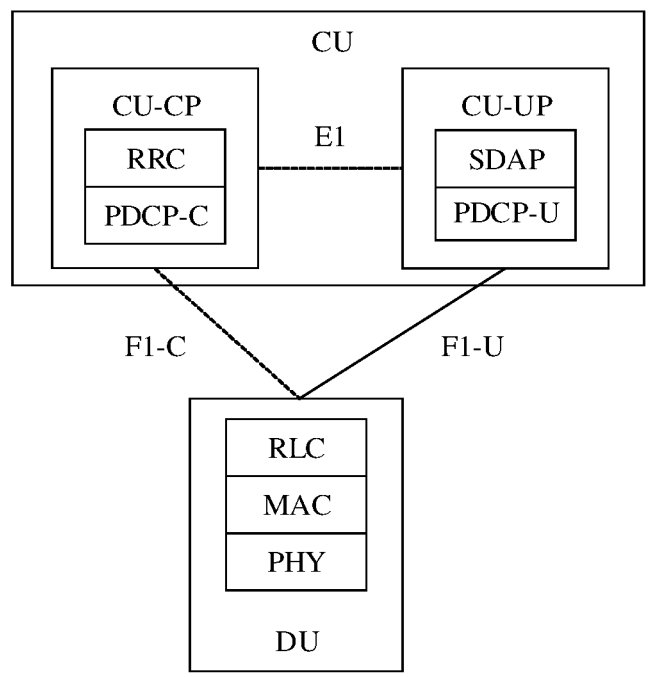
FIG. 2 is a schematic diagram of a protocol stack of a radio access network device according to an embodiment of this application.

Radio access network (RAN) device: The radio access network device is a device that connects a terminal device to a wireless network, and may be an evolved NodeB (evolutional Node B, eNB or eNodeB) in long term evolution (LTE), or may be a relay station or an access point, or may be a base station in a 5G network, such as a transmission reception point (transmission and reception point, TRP) or a controller. This is not limited herein. In a possible manner, the radio access network device may be a base station (for example, a gNB) with a centralized unit (CU) and distributed unit (DU) split architecture, as shown in FIG. 2. FIG. 2 is a schematic diagram of a protocol stack of a radio access network device according to an embodiment of this application. The RAN device may be connected to a core network device (for example, a core network in LTE or a core network in 5G). A CU and a DU may be understood as division of a base station from the perspective of logical functions. The CU and the DU may be physically separated or deployed together. A plurality of DUs may share one CU, or one DU may be connected to a plurality of CUs (not shown in the figure). The CU and the DU may be connected through an interface, for example, an F1 interface. The CU and the DU may be obtained through division based on protocol layers of a wireless network. For example, functions of a radio resource control (RRC) layer, a service data adaptation protocol (SDAP) layer, and a packet data convergence protocol (PDCP) layer are deployed on the CU, and functions of a radio link control (RLC) layer, a media access control (MAC) layer, and a physical (PHY) layer are deployed on the DU. It may be understood that processing function division of the CU and the DU based on the protocol layers is merely an example, and there may be other division. For example, the CU or the DU may have functions of more protocol layers through division. For example, the CU or the DU may alternatively have some processing functions of protocol layers through division. In a design, some functions of the RLC layer and functions of a protocol layer above the RLC layer are deployed on the CU, and remaining functions of the RLC layer and functions of a protocol layer below the RLC layer are deployed on the DU. In another design, functions of the CU or the DU may alternatively be obtained through division based on a service type or another system requirement. For example, division is performed based on a latency, functions whose processing time needs to satisfy a latency requirement are deployed on the DU, and functions whose processing time does not need to satisfy the latency requirement are deployed on the CU. In another design, the CU may alternatively have one or more functions of the core network. One or more CUs may be disposed in a centralized manner or a separated manner.

For example, the CUs may be disposed on a network side for ease of centralized management. The DU may have a plurality of radio frequency functions, or the radio frequency functions may be remotely set.

Functions of the CU may be implemented by one entity, or may be implemented by different entities. For example, the functions of the CU may be further divided. For example, a control plane (CP) is separated from a user plane (UP), in other words, a CU control plane (CU-CP) and a CU user plane (CU-UP) are obtained. For example, the CU-CP and the CU-UP may be implemented by different function entities. The CU-CP and the CU-UP may be coupled to the DU to jointly implement functions of the base station. In a possible manner, the CU-CP is responsible for a control plane function, and mainly includes RRC and PDCP-C. The PDCP-C is mainly responsible for control plane data encryption and decryption, integrity protection, data transmission, and the like. The CU-UP is responsible for a user plane function, and mainly includes an SDAP and PDCP-U. The SDAP is mainly responsible for processing data of the core network and mapping a data flow to a bearer. The PDCP-U is mainly responsible for data plane encryption and decryption, integrity protection, header compression, serial number maintenance, data transmission, and the like. The CU-CP is connected to the CU-UP through an E1 interface. The CU-CP indicates that the gNB is connected to the core network through an Ng interface. The CU-CP is connected to the DU through F1-C(control plane), and the CU-UP is connected to the DU through F1-U (user plane). Certainly, in another possible implementation, the PDCP-C is alternatively in the CU-UP.

Core network device: The core network device may be an access and mobility management function (AMF) entity, a session management function (SMF) entity, a mobility management entity (mobility management entity, MME), or another core network device.

Terminal device: The terminal device may be a wireless terminal or a wired terminal. The wireless terminal may be a device having a wireless transceiver function, and may be deployed on land, including an indoor device, an outdoor device, a handheld device, or a vehicle-mounted device; or may be deployed on water (for example, a ship); or may be deployed in the air (for example, on a plane, a balloon, or a satellite). The terminal device may be a mobile phone, a tablet computer (Pad), a computer with a wireless transceiver function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. This is not limited herein. It may be understood that, in the embodiments of this application, the terminal device may also be referred to as user equipment (UE).

In this application, "at least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" generally indicates an "or" relationship between the associated objects, and "at least one item (piece) of the following" or a similar expression thereof means any combination of these items, including a singular item (piece) or any combination of plural items (pieces). For example, at least one item (piece) of a, b, or c may represent: a, b, c, a-b, a-c, b-c, or a-b-c, where a, b, and c may be singular or plural.

It may be understood that, in the embodiments of this application, the terminal device and/or the network device may perform some or all steps in the embodiments of this application. These steps or operations are merely examples. In the embodiments of this application, other operations or variations of various operations may be further performed. In addition, the steps may be performed in a sequence different from a sequence presented in the embodiments of this application, and not all operations in the embodiments of this application may be performed.

In the embodiments of this application, there are two types of networks: a public network and a non-public network. A type of the non-public network may be generally identified by using a non-public network identifier (NPN identification, NPN ID), and different terminal devices support different NPN IDs. A terminal device can camp on only an NPN corresponding to an NPN ID supported by the terminal device, and can initiate a service only in an NPN corresponding to an NPN ID that the terminal device is subscribed to. In an implementation, the NPN ID may alternatively be a closed access group identifier (closed access group ID, CAG ID).

Currently, the non-public network may be deployed in the following manners:

Manner 1: The non-public network may be a cell provided with a non-public network-dedicated base station or a core network. A terminal device supporting this non-public network may camp on the base station or the core network and initiate a service. This non-public network is generally referred to as a stand-alone (standalone, SA) NPN cell.

Manner 2: The non-public network may alternatively be a slice of a public network, in other words, a slice in the public network may be configured as the non-public network. All terminal devices may camp on this network. After a terminal device enters a connected mode and initiates a service request, the network develops, based on whether a service is a non-public network service, the service of the terminal device to a corresponding non-public network slice.

Figure 3:
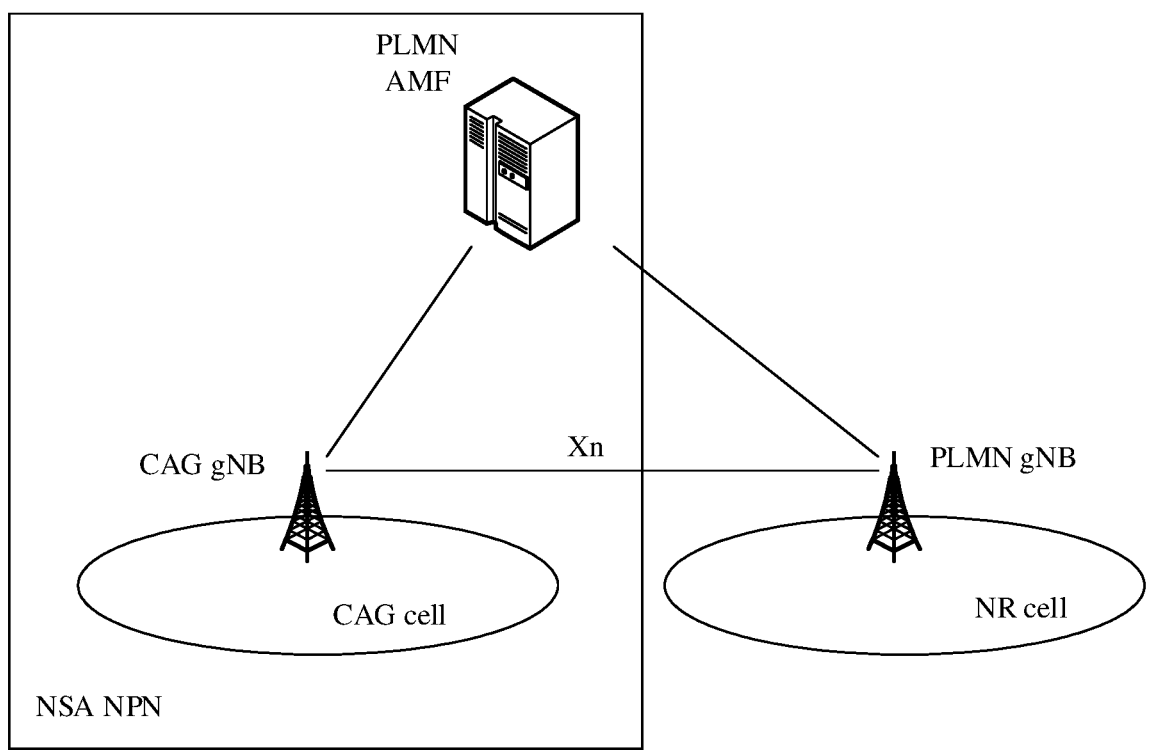
FIG. 3 is a schematic diagram of a non-public network according to an embodiment of this application.

Manner 3: The non-public network may alternatively be a cell deployed by an operator. Camp-on or initial access of a terminal device in the non-public network is allowed. This non-public network is generally referred to as a closed access group (CAG) cell or a non-stand-alone (NSA) NPN cell. In a possible implementation, as shown in FIG. 3, a base station corresponding to a CAG cell may be referred to as a CAG gNB, and the CAG gNB communicates with a public land mobile network (PLMN) authentication management function (AMF) (which may also be a CAG AMF). In addition, the PLMN AMF further communicates with a PLMN gNB, and the PLMN gNB may communicate with the CAG gNB through an Xn/X2 interface. It may be understood that, because a base station and a core network device in Manner 3 are deployed by the operator, the foregoing CAG gNB is an operator base station supporting the non-public network, and the CAG AMF is an operator core network device supporting the non-public network. Whether the CAG gNB and the CAG AMF support a public network service is not limited in the embodiments of this application.

It may be understood that both Manner 2 and Manner 3 are NSA NPN deployment manners. Because Manner 2 and Manner 3 are operator deployment, an X2/Xn connection may be established between a non-public network base station and an operator base station, and/or a connection may be established between a non-public network core network and a public network core network, or a non-public network core network and a public network core network are a same core network.

Based on non-public network deployment, there are three types of terminal devices:

1. Non-public network terminal device: The non-public network terminal device is a terminal device only subscribed to the non-public network, for example, a smart device of a smartphone in a factory.
2. Terminal device that supports both the non-public network and the public network: The terminal device is, for example, a mobile phone of a non-public network access person.
3. Public network terminal device: The public network terminal device is a terminal device subscribed to only the public network, and this terminal device is not applicable to the non-public network completely.

For the foregoing three types of terminal devices, the first two types of terminal devices are applicable to the non-public network, and the third type of terminal device is not applicable to the non-public network.

If a service interworking mechanism between the non-public network and the public network is considered in both an SA NPN scenario and an NSA NPN scenario, the public network can support a non-public network service, and the non-public network can also support a public network service.

Figure 4:
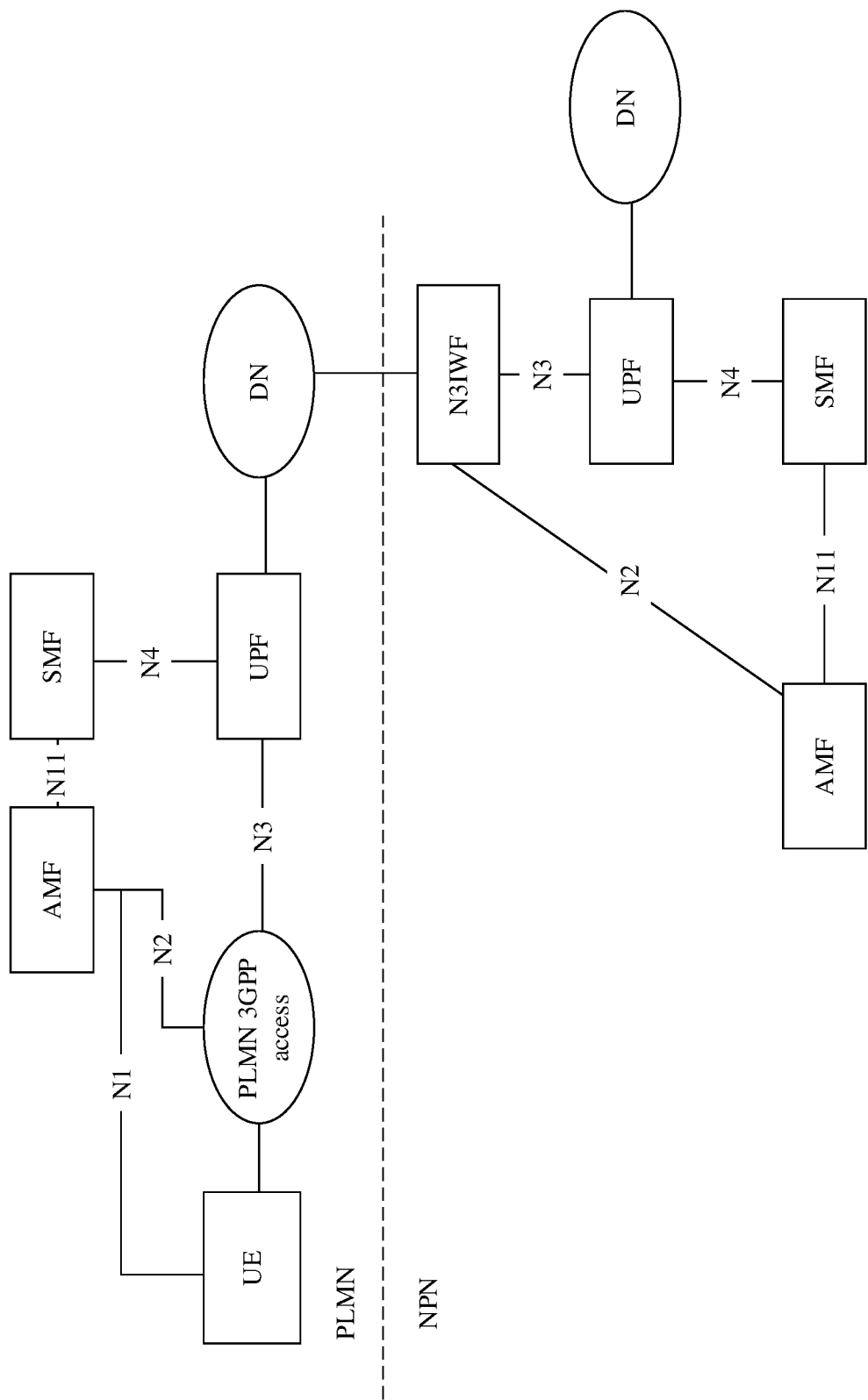
FIG. 4 is a schematic diagram of a non-public network service supported by a public network by using an N3IWF according to an embodiment of this application.

For example, when the public network supports the non-public network service, the following three service attributes exist:

1. a public network service;
2. a service of a non-public network that belongs to a same operator as the public network, that is, a direct non-public network service; and
3. a non-public network service supported by the public network by using an N3IWF (in a possible implementation, as shown in FIG. 4, the terminal device is UE, and the UE in the public network performs the non-public network service by using the N3IWF, to be specific, the UE is connected to a PLMN 3GPP access, the PLMN 3GPP access is connected to a user plane function (UPF) on a PLMN side through N3, the UPF is connected to a data network (DN) on the PLMN side, and the UPF is connected to an SMF on the PLMN side through N4; the SMF is connected to an AMF on the PLMN side through N11, and the AMF is connected to the UE through N1, and is connected to the PLMN 3GPP access through N2; and the DN on the PLMN side is connected to an N3IWF on an NPN side, the N3IWF is connected to an AMF on the NPN side through N2 and is connected to a UPF on the NPN side through N3, the UPF is connected to a DN on the NPN side, and is connected to an SMF on the NPN side through N4, and the SMF is further connected to the AMF through N11).

Figure 5:
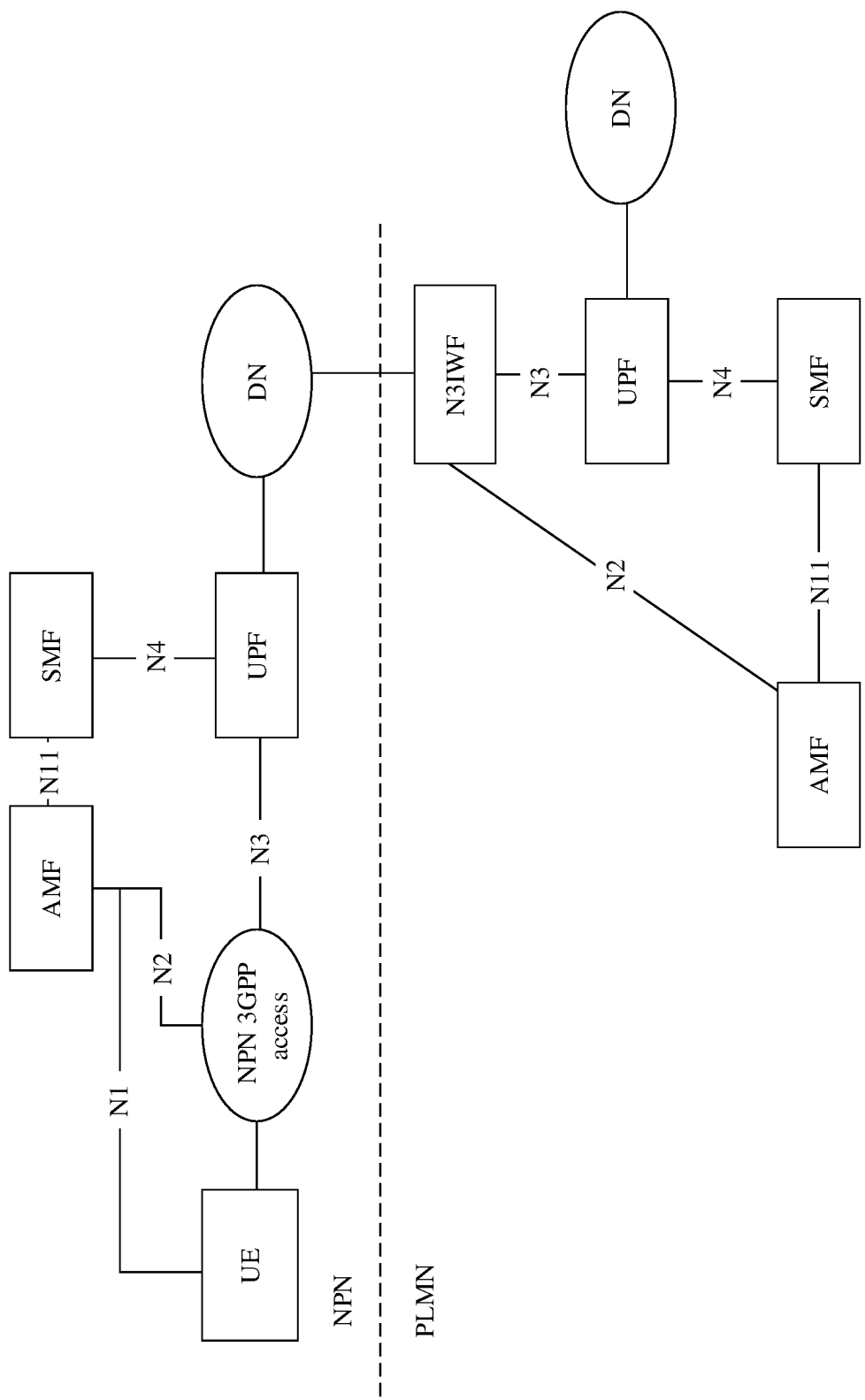
FIG. 5 is a schematic diagram of a public network service supported by a non-public network by using an N3IWF according to an embodiment of this application.

For example, when the non-public network supports the public network service, the following three service attributes are available:

1. a non-public network service;
2. a service of a public network that belongs to a same operator as the non-public network, that is, a direct public network service; and
3. a public network service supported by the non-public network by using an N3IWF (in a possible implementation, as shown in FIG. 5, the terminal device is UE, and the UE in the non-public network performs the non-public network service by using the N3IWF, to be specific, the UE is connected to an NPN 3GPP access, the NPN 3GPP access is connected to a UPF on an NPN side through N3, the UPF is connected to a DN on the NPN side, and the UPF is connected to an SMF on the NPN side through N4; the SMF is connected to an AMF on the NPN side through N11, and the AMF is connected to the UE through N1, and is connected to the PLMN 3GPP access through N2; and the DN on the PLMN side is connected to an N3IWF on a PLMN side, the N3IWF is connected to an AMF on the PLMN side through N2 and is connected to a UPF on the PLMN side through N3, the UPF is connected to a DN on the PLMN side, and is connected to an SMF on the PLMN side through N4, and the SMF is further connected to the AMF through N11).

Optionally, the non-public network service supported by the public network by using the N3IWF and the public network service supported by the non-public network by using the N3IWF may belong to a same service attribute, and the service attribute may be referred to as a cross-network service.

Therefore, when there are services with the foregoing plurality of service attributes, the solutions of the embodiments of this application can better perform access control on the terminal device for different services. A specific implementation solution is described as follows.

Figure 6:
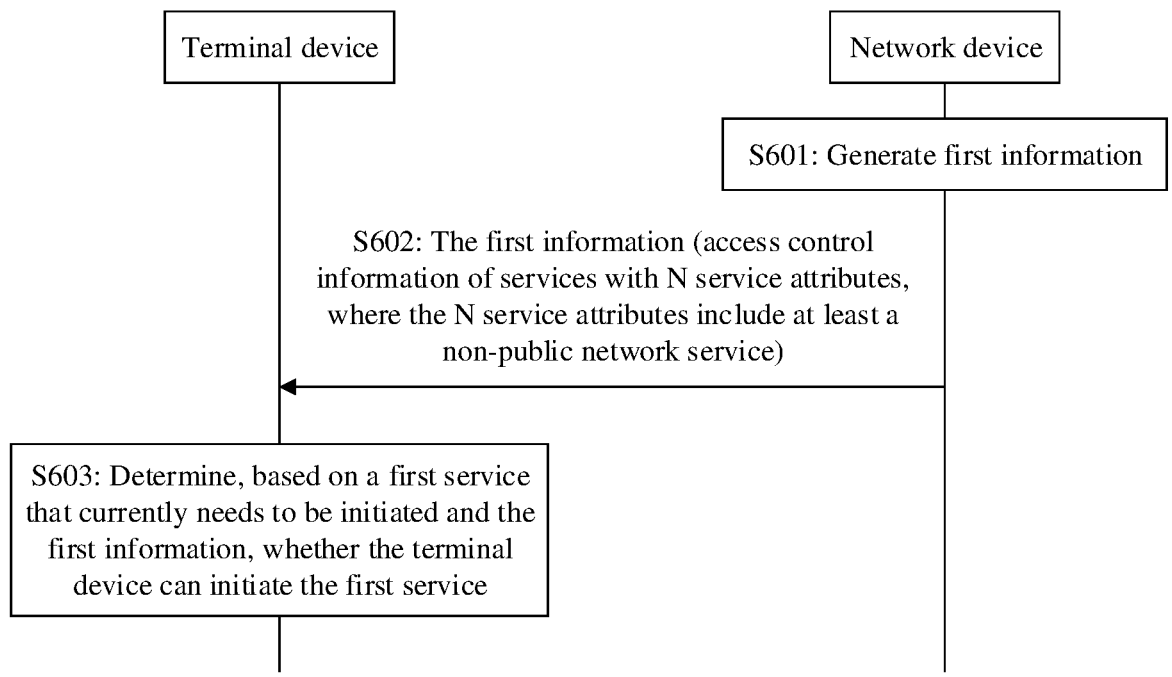
FIG. 6 is a flowchart of a communications method according to an embodiment of this application.

FIG. 6 is a flowchart of a communications method according to an embodiment of this application. As shown in FIG. 6, the method in this embodiment may include the following steps:

S601: A network device generates first information.

S602: The network device sends the first information to a terminal device. Correspondingly, the terminal device receives the first information sent by the network device.

S603: The terminal device determines, based on a first service that currently needs to be initiated and the first information, whether the terminal device can initiate the first service.

In this embodiment, the network device may obtain access control information of services with N service attributes, where N is an integer greater than or equal to 1. In addition, the N service attributes include at least a non-public network service. The access control information of the services with the N service attributes may be, for example, pre-configured in the network device. This is not limited in this embodiment. The network device generates the first information, where the generated first information includes the access control information of the services with the N service attributes. Then, the network device sends the first information to the terminal device. Correspondingly, the terminal device receives the first information sent by the network device. Optionally, the network device may send the first information to at least one terminal device through broadcasting. The terminal device mentioned in this embodiment may be any terminal device that receives the first information sent by the network device through broadcasting.

After receiving the first information, the terminal device may obtain the access control information of the services with the N service attributes based on the first information. When the terminal device needs to initiate a service, the service may be referred to as the first service, and the first service may be any one of the services with the N service attributes. The terminal device may determine, based on the first service and the access control information of the services with the N service attributes, access control information corresponding to the first service, and then determine, based on the access control information corresponding to the first service, whether the terminal device can initiate the first service. For example, a non-access stratum (NAS stratum) of the terminal device sends the access control information of the services with the N service attributes to an access stratum (AS stratum) of the terminal device, and the AS stratum of the terminal device determines, based on the first service that currently needs to be initiated and the access control information of the services with the N service attributes, whether the terminal device can initiate the first service.

Optionally, the access control information includes an access percentage (uac-BarringFactor) of the terminal device. Optionally, the access control information may include at least one of the following: barring time (uac-BarringTime) of the terminal device and an access identity (uac-BarringForAccessIdentity) of the terminal device. A possible implementation in which the terminal device determines, based on the access control information corresponding to the first service, whether the terminal device can initiate the first service may be, for example, that the terminal device determines, based on a random number generated by the terminal device and the access percentage of the terminal device, whether the terminal device can initiate the first service. For example, if the random number is less than the access percentage of the terminal device, it indicates that the terminal device can initiate the first service; or if the random number is greater than or equal to the access percentage of the terminal device, it indicates that the terminal device cannot initiate the first service. If the access control information includes the barring time of the terminal device, after the terminal device determines that the terminal device cannot initiate the first service and after the barring time, the terminal device re-determines, based on a generated random number and the access percentage of the terminal device, whether the terminal device can initiate the first service.

Optionally, the foregoing non-public network service includes at least one of the following: a non-public network service transmitted through a non-public network and a non-public network service transmitted through a public network. The non-public network service transmitted through the public network may include a non-public network service directly supported by the public network and a non-public network service indirectly supported by the public network. The non-public network service directly supported by the public network may be: In the public network, the non-public network service is transmitted to a data network of the non-public network through the public network. The non-public network service indirectly supported by the public network may be: When the non-public network service is transmitted through the public network, the non-public network service is transmitted to an N3IWF of the non-public network through a user plane of the public network and then transmitted to a data network of the non-public network by the N3IWF of the non-public network. In an implementation shown in FIG. 4, generally, for a non-public network service indirectly supported by a public network, the public network does not learn whether the service is a non-public network service. Optionally, the foregoing non-public network service may include at least one of the following: a non-public network service transmitted through the non-public network, a non-public network service directly supported by the public network, and a non-public network service indirectly supported by the public network.

Optionally, the non-public network service transmitted through the non-public network includes K access categories of non-public network services transmitted through the non-public network, where K is an integer greater than or equal to 1. In Table 1, for example, if K is equal to 9, the nine access categories are respectively distinguished by using 0 to 8 below. However, this embodiment is not limited thereto.

TABLE 1

| Access Category number | Conditions related to UE | Type of access attempt |
| --- | --- | --- |
| 0 | All | MO signalling resulting from paging. |
| 1 | UE is configured for delay tolerant service and subject to access control for Access Category 1, which is judged based on relation of UE's HPLMN and the selected PLMN. | All except for Emergency |
| 2 | All | Emergency |
| 3 | All except for the conditions in Access Category 1 | MO signalling on NAS level resulting from other than paging |
| 4 | All except for the conditions in Access Category 1 | multimedia telephony (MMTEL) voice |
| 5 | All except for the conditions in Access Category 1 | MMTELvideo |
| 6 | All except for the conditions in Access Category 1 | Short message service (SMS) |
| 7 | All except for the conditions in Access Category 1 | MO data that do not belong to any other Access Categories |
| 8 | All except for the conditions in Access Category 1 | MO signalling on RRC level resulting from other than paging |

According to the communications method provided in this embodiment, the terminal device receives the first information sent by the network device. The first information includes the access control information of the services with the N service attributes. The N service attributes include at least the non-public network service. Then, the terminal device determines, based on the first service that currently needs to be initiated and the first information, whether the terminal device can initiate the first service. Therefore, access control on the terminal device is implemented when there is a non-public network service.

In some embodiments, the N service attributes may further include at least one of the following: a public network service and a cross-network service.

Optionally, the foregoing public network service may include at least one of the following: a public network service transmitted through a public network and a public network service transmitted through a non-public network. The public network service transmitted through the non-public network may include a public network service directly supported by the non-public network and a public network service indirectly supported by the non-public network. The public network service directly supported by the non-public network may be: In the non-public network, the public network service is transmitted to a data network of the public network through the non-public network. The public network service indirectly supported by the non-public network may be: When the public network service is transmitted through the non-public network, the public network service is transmitted to an N3IWF of the public network through a user plane of the non-public network and then is transmitted to a data network of the public network by the N3IWF of the public network. In an implementation shown in FIG. 5, generally, for a public network service indirectly supported by a non-public network, the non-public network does not learn whether the service is a public network service. Optionally, the foregoing public network service may include at least one of the following: a public network service transmitted through the public network, a public network service directly supported by the non-public network, and a public network service indirectly supported by the non-public network.

Optionally, the public network service transmitted through the public network includes M access categories of public network services transmitted through the public network, where M is an integer greater than or equal to 1. The M access categories may be shown, for example, in Table 1. This is not limited in this embodiment.

Optionally, the foregoing N service attributes may include a non-public network service and a public network service, for example, a non-public network service transmitted through a non-public network, a non-public network service transmitted through a public network, a public network service transmitted through the public network and a public network service transmitted through the non-public network.

Alternatively, the foregoing N service attributes include a non-public network service and a cross-network service, for example, a non-public network service transmitted through a non-public network and a cross-network service; or a non-public network service transmitted through a non-public network and a non-public network service transmitted through a public network; or a non-public network service transmitted through a non-public network, a non-public network service transmitted through a public network, and a public network service transmitted through the non-public network.

Alternatively, the foregoing N service attributes include a non-public network service, a public network service, and a cross-network service, for example, a non-public network service transmitted through a non-public network, a public network service transmitted through a public network, and a cross-network service.

When the terminal device currently accesses the non-public network, the cross-network service indicates a public network service transmitted through the non-public network. Alternatively, when the terminal device currently accesses the public network, the cross-network service indicates a non-public network service transmitted through the public network.

In some embodiments, in a first possible implementation, the foregoing N service attributes include a public network service transmitted through a public network, a public network service transmitted through a non-public network, a non-public network service transmitted through the non-public network, and a non-public network service transmitted through the public network. The public network service transmitted through the public network may include nine access categories of public network services transmitted through the public network, for example, as shown in Table 2.

TABLE 2

| Access Category number | Conditions related to UE | Type of access attempt |
|---|---|---|
| 0 | All | MO signalling resulting from paging |
| 1 | UE is configured for delay tolerant service and subject to access control for Access Category 1, which is judged based on relation of UE's HPLMN and the selected PLMN | All except for Emergency |
| 2 | All | Emergency |
| 3 | All except for the conditions in Access Category 1 | MO signalling on NAS level resulting from other than paging |
| 4 | All except for the conditions in Access Category 1 | MMTEL voice |
| 5 | All except for the conditions in Access Category 1 | MMTEL video |
| 6 | All except for the conditions in Access Category 1 | SMS |
| 7 | All except for the conditions in Access Category 1 | MO data that do not belong to any other Access Categories |
| 8 | All except for the conditions in Access Category 1 | MO signalling on RRC level resulting from other than paging |
| 9 | All except for the conditions in Access Category 1 | NPN access supported by PLMN |
| 10 | All except for the conditions in Access Category 1 | NPN access supported by NPN |
| 11 | All except for the conditions in Access Category 1 | PLMN access supported by NPN |

As shown in Table 2, number 0 to number 8 indicate the nine access categories of public network services transmitted through the public network, number 9 indicates the non-public network service transmitted through the public network, number 10 indicates the non-public network service transmitted through the non-public network, and number 11 indicates the public network service transmitted through the non-public network.

In a second possible implementation, the foregoing N service attributes include a public network service transmitted through a public network, a non-public network service transmitted through a non-public network, and a cross-network service. The public network service transmitted through the public network may include nine access categories of public network services transmitted through the public network, for example, as shown in Table 3.

nal device is currently located in the non-public network, the terminal device may indicate, according to number 9, the public network service transmitted through the non-public network. In this embodiment, by adding two service attributes, access control on the public network service, the non-public network service, the non-public network service transmitted through the public network, and the public network service transmitted through the non-public network of the terminal device can be implemented. Therefore, the first information is more concise.

In a third possible implementation, the foregoing N service attributes include a public network service transmitted through a public network, a public network service transmitted through a non-public network, a non-public network service transmitted through the non-public network, and a non-public network service transmitted through the public

TABLE 3

| Access Category number | Conditions related to UE | Type of access attempt |
|---|---|---|
| 0 | All | MO signalling resulting from paging |
| 1 | UE is configured for delay tolerant service and subject to access control for Access Category 1, which is judged based on relation of UE's HPLMN and the selected PLMN | All except for Emergency |
| 2 | All | Emergency |
| 3 | All except for the conditions in Access Category 1 | MO signalling on NAS level resulting from other than paging |
| 4 | All except for the conditions in Access Category 1 | MMTEL voice |
| 5 | All except for the conditions in Access Category 1 | MMTEL video |
| 6 | All except for the conditions in Access Category 1 | SMS |
| 7 | All except for the conditions in Access Category 1 | MO data that do not belong to any other Access Categories |
| 8 | All except for the conditions in Access Category 1 | MO signalling on RRC level resulting from other than paging |
| 9 | All except for the conditions in Access Category 1 | NPN access supported by PLMN, or PLMN access supported by NPN |
| 10 | All except for the conditions in Access Category 1 | NPN access supported by NPN |

As shown in Table 3, number 0 to number 8 indicate the nine access categories of public network services transmitted through the public network, number 9 indicates the cross-network service, and number 10 indicates the non-public network service transmitted through the non-public network. When the terminal device is currently located in the public network, the terminal device may indicate, according to number 9, the non-public network service transmitted through the public network; or when the terminetwork. The public network service transmitted through the public network may include nine access categories of public network services transmitted through the public network, and the non-public network service transmitted through the non-public network may include nine access categories of non-public network services transmitted through the non-public network, for example, as shown in Table 4.

TABLE 4

| Access Category number | Conditions related to UE | Type of access attempt |
|---|---|---|
| 0 | All | MO signalling resulting from paging |
| 1 | UE is configured for delay tolerant service and subject to access control for Access Category 1, which is judged based on relation of UE's HPLMN and the selected PLMN | All except for Emergency |
| 2 | All | Emergency |
| 3 | All except for the conditions in Access Category 1 | MO signalling on NAS level resulting from other than paging |
| 4 | All except for the conditions in Access Category 1 | MMTEL voice |

TABLE 4-continued

| Access Category number | Conditions related to UE | Type of access attempt |
| --- | --- | --- |
| 5 | All except for the conditions in Access Category 1 | MMTEL video |
| 6 | All except for the conditions in Access Category 1 | SMS |
| 7 | All except for the conditions in Access Category 1 | MO data that do not belong to any other Access Categories |
| 8 | All except for the conditions in Access Category 1 | MO signalling on RRC level resulting from other than paging |
| 9 | All except for the conditions in Access Category 1 | NPN access supported by PLMN |
| 10 | All | MO signalling resulting from paging |
| 11 | UE is configured for delay tolerant service and subject to access control for Access Category 11, which is judged based on relation of UE's HPLMN and the selected PLMN. | All except for Emergency |
| 12 | All | Emergency |
| 13 | All except for the conditions in Access Category 11 | MO signalling on NAS level resulting from other than paging |
| 14 | All except for the conditions in Access Category 11 | MMTEL voice |
| 15 | All except for the conditions in Access Category 11 | MMTEL video |
| 16 | All except for the conditions in Access Category 11 | SMS |
| 17 | All except for the conditions in Access Category 11 | MO data that do not belong to any other Access Categories |
| 18 | All except for the conditions in Access Category 11 | MO signalling on RRC level resulting from other than paging |
| 19 | All except for the conditions in Access Category 11 | PLMN access supported by NPN |

As shown in Table 4, number 0 to number 8 indicate the nine access categories of public network services transmitted through the public network, number 9 indicates the non-public network service transmitted through the public network, number 10 to number 18 indicate the nine access categories of non-public network services transmitted through the non-public network, and number 19 indicates the public network service transmitted through the non-public network. When the terminal device is currently located in the public network, the terminal device may indicate, according to number 9, the non-public network service transmitted through the public network; or when the terminal device is currently located in the non-public network, the terminal device may indicate, according to number 19, the public network service transmitted through the non-public network. Therefore, in this embodiment, access control may be performed on different access categories of the non-public network services, thereby improving access control flexibility.

In some embodiments, the first information includes access control information of services with N service attributes corresponding to each of R PLMNs, where R is an integer greater than or equal to 1. Correspondingly, a possible implementation of S603 is: The terminal device determines, based on the first service that currently needs to be initiated, an RPLMN of the terminal device, and the first information, whether the terminal device can initiate the first service. The RPLMN of the terminal device is any one of the R PLMNs.

In this embodiment, the terminal device obtains, from the R PLMNs based on the RPLMM of the terminal device, access control information of services with N service attributes corresponding to the RPLMN, and then determines, based on the first service that currently needs to be initiated and the access control information of the services with the N service attributes corresponding to the RPLMN, whether the terminal device can initiate the first service.

For example, the first information in this embodiment may be as follows:

UAC-Barring Info
  PLMN separately configured with UAC: UAC-BarringPer PLMN-List
  perPLMN
    PLMN index
      UAC-ACBarring ListType(Choice)
        uac-BarrringPerCatList
          AccessCategory
          uac-barringInfoSetIndex
UAC-Barring InfoSetList
  UAC-Barring InfoSet
    Access percentage uac-BarringFactor
    Barring time uac-BarringTime
    Access identity uac-Barring ForAccessIdentity Each PLMN is identified by using a PLMN index. Each PLMN is provided with services with N service attributes, and different service attributes may be distinguished by using AccessCategory. Each AccessCategory is corresponding to uac-barringInfoSetIndex, and information such as an access percentage, barring time, and an access identity corresponding to uac-barringInfoSetIndex may be obtained from UAC-BarringInfoSetList. The information may be referred to as access control information.

Figure 7:
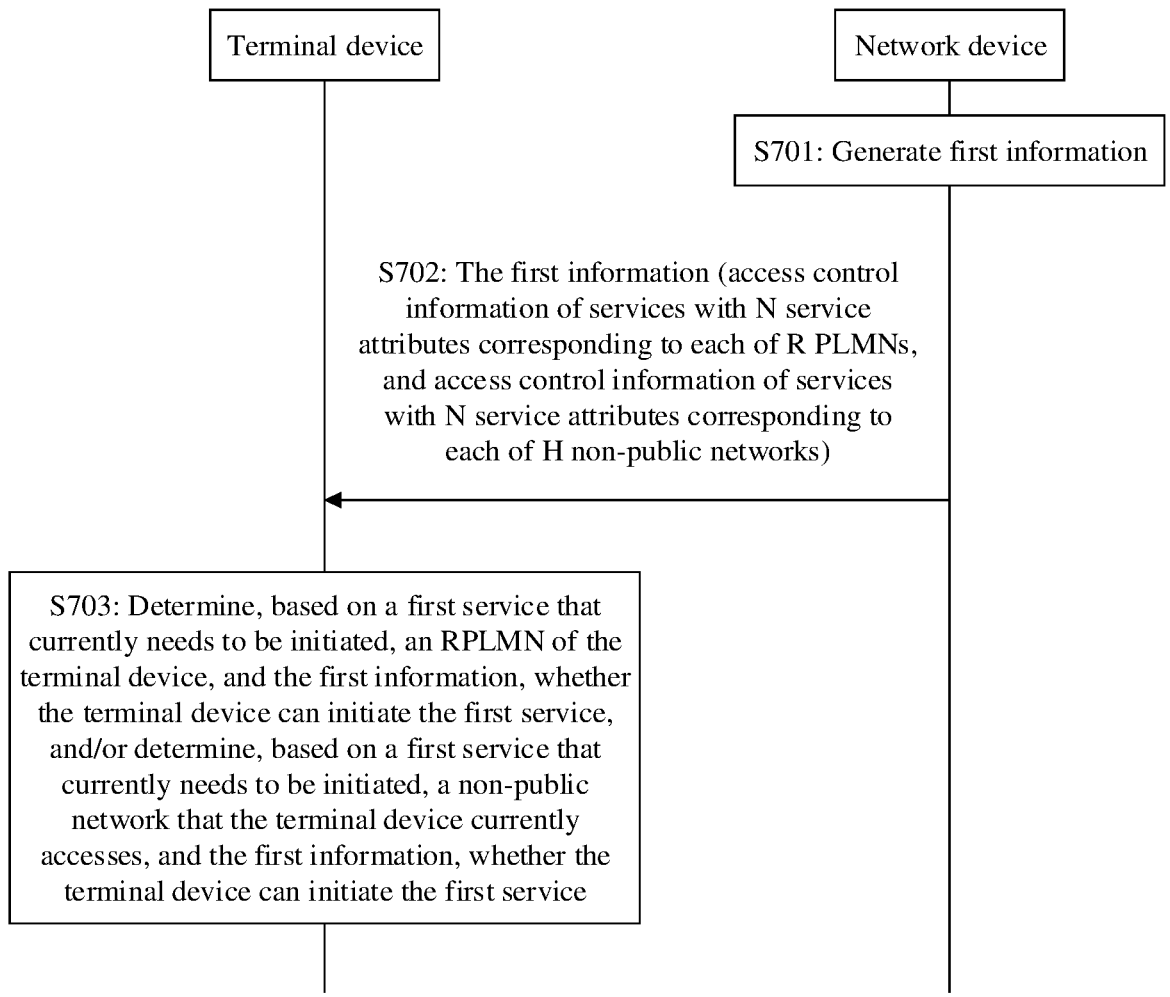
FIG. 7 is a flowchart of a communications method according to another embodiment of this application.

FIG. 7 is a flowchart of a communications method according to another embodiment of this application. As shown in FIG. 7, the method in this embodiment may include the following steps:

S701: A network device generates first information.

S702: The network device sends the first information to a terminal device. Correspondingly, the terminal device receives the first information sent by the network device.

S703: The terminal device determines, based on a first service that currently needs to be initiated, an RPLMN of the terminal device, and the first information, whether the terminal device can initiate the first service, and/or the terminal device determines, based on a first service that currently needs to be initiated, a non-public network that the terminal device currently accesses, and the first information, whether the terminal device can initiate the first service.

In this embodiment, the first information includes access control information of services with N service attributes corresponding to each of R PLMNs, and access control information of services with N service attributes corresponding to each of H non-public networks, where R and H are integers greater than or equal to 1. After receiving the first information, the terminal device determines, based on the first service that currently needs to be initiated, the RPLMN of the terminal device, and the first information, whether the terminal device can initiate the first service, and/or the terminal device determines, based on the first service that currently needs to be initiated, the non-public network that the terminal device currently accesses, and the first information, whether the terminal device can initiate the first service.

In this embodiment, if the terminal device currently accesses the public network, it indicates that the terminal device is only located in the RPLMN of the terminal device, so that the terminal device can determine, based on the first service that currently needs to be initiated, the RPLMN of the terminal, and the first information, whether the terminal device can initiate the first service.

Alternatively, if the terminal device currently accesses the non-public network, it indicates that both the RPLMN of the terminal device and the non-public network that the terminal device currently accesses exist. The RPLMN may be indicated by using a corresponding PLMN ID, and the non-public network that the terminal device currently accesses may be indicated by using a non-public network identifier, for example, a CAG ID or an NPN ID. In a possible implementation, the terminal device may determine, based on the first service that currently needs to be initiated, the RPLMN of the terminal device, and the first information, whether the terminal device can initiate the first service. If it is determined, based on the RPLMN of the terminal device, that the terminal device cannot initiate the first service, the terminal device cannot initiate the first service; or if it is determined, based on the RPLMN of the terminal device, that the terminal device can initiate the first service, the terminal device re-determines, based on the first service that currently needs to be initiated, the non-public network that the terminal device currently accesses, and the first information, whether the terminal device can initiate the first service; and if it is determined, based on the non-public network that the terminal device currently accesses, that the terminal device can initiate the first service, the terminal device can initiate the first service, or if it is determined, based on the non-public network that the terminal device currently accesses, that the terminal device cannot initiate the first service, the terminal device cannot initiate the first service. In another implementation, the terminal device may determine, based on the first service that currently needs to be initiated, the non-public network that the terminal device currently accesses, and the first information, whether the terminal device can initiate the first service. If it is determined, based on the non-public network that the terminal device currently accesses, that the terminal device cannot initiate the first service, the terminal device cannot initiate the first service; or if it is determined, based on the non-public network that the terminal device currently accesses, that the terminal device can initiate the first service, the terminal device re-determines, based on the first service that currently needs to be initiated, the RPLMN of the terminal device, and the first information, whether the terminal device can initiate the first service; and if it is determined, based on the RPLMN of the terminal device, that the terminal device can initiate the first service, the terminal device can initiate the first service, or if it is determined, based on the RPLMN of the terminal device, that the terminal device cannot initiate the first service, the terminal device cannot initiate the first service.

In conclusion, when the terminal device currently accesses the non-public network, if the terminal device determines, based on the first service that currently needs to be initiated, the RPLMN of the terminal device, and the first information, that the terminal device can initiate the first service, and determines, based on the first service that currently needs to be initiated, the non-public network that the terminal device currently accesses, and the first information, that the terminal device can initiate the first service, it is finally determined that the terminal device can initiate the first service. Otherwise, it is finally determined that the terminal device cannot initiate the first service.

If the terminal device determines, based on the first service that currently needs to be initiated, the RPLMN of the terminal device, and the first information, that the terminal device cannot initiate the first service, and determines, based on the first service that currently needs to be initiated, the non-public network that the terminal device currently accesses, and the first information, that the terminal device cannot initiate the first service, the barring time of the terminal device is a largest value between first barring time and second barring time. The first barring time is barring time in access control information of the first service corresponding to the RPLMN of the terminal device, and the second barring time is barring time in access control information of the first service corresponding to the non-public network that the terminal device currently accesses.

The first information in this embodiment may include the following:

```
uac-BarringPerPLMN-List
    perPLMN
        PLMN ID index
        UAC-ACBarringListType(Choice)
            uac-BarrringPerCatList
                AccessCategory
                uac-barringInfoSetIndex
uac-BarringPerCAGorNPN-List
    perCAGorNPN
        CAGorNPNID index
        UAC-ACBarringListType(Choice)
            uac-BarrringPerCatList
                AccessCategory
                uac-barringInfoSetIndex
    UAC-BarringInfoSetList
        UAC-BarringInfoSet
            Access percentage uac-BarringFactor
            Barring time uac-BarringTime
            Access identity uac-BarringForAccessIdentity
```

Each PLMN is identified by using a PLMN ID index. Each PLMN is provided with services with N service attributes, and different service attributes may be distinguished by using AccessCategory. Each AccessCategory is corresponding to uac-barringInfoSetIndex, and information such as an access percentage, barring time, and an access identity corresponding to uac-barringInfoSetIndex may be obtained from UAC-BarringInfoSetList. The information may be referred to as access control information. In addition, each non-public network is identified by using a CAGorNPNID index. Each non-public network is provided with services with N service attributes, and different service attributes may be distinguished by using AccessCategory. Each AccessCategory is corresponding to uac-barringInfoSetIndex, and information such as an access percentage, barring time, and an access identity corresponding to uac-barringInfoSetIndex may be obtained from UAC-BarringInfoSetList. The information may be referred to as access control information.

Therefore, according to the foregoing solutions, access control on the terminal device may be implemented when there is a non-public network service.

Figure 8:
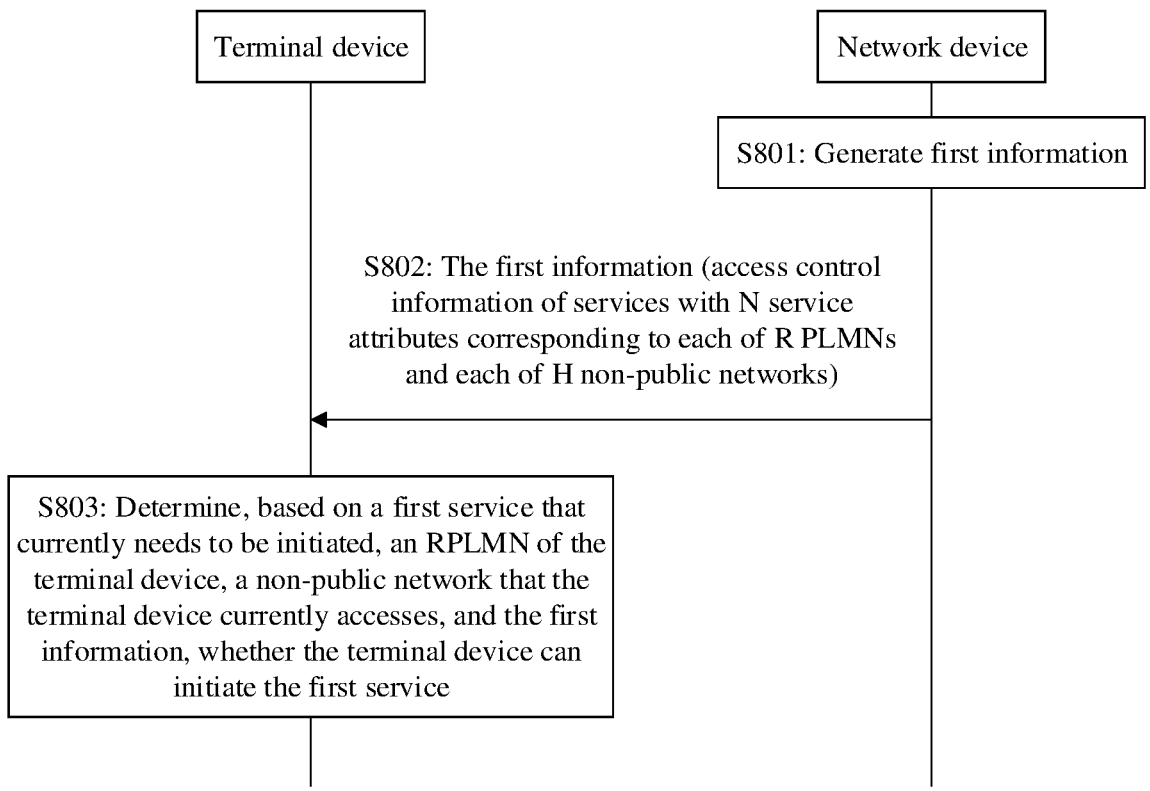
FIG. 8 is a flowchart of a communications method according to another embodiment of this application.

FIG. 8 is a flowchart of a communications method according to another embodiment of this application. As shown in FIG. 8, the method in this embodiment may include the following steps:

S801: A network device generates first information.

S802: The network device sends the first information to a terminal device. Correspondingly, the terminal device receives the first information sent by the network device.

S803: The terminal device determines, based on a first service that currently needs to be initiated, an RPLMN of the terminal device, a non-public network that the terminal device currently accesses, and the first information, whether the terminal device can initiate the first service.

In this embodiment, the first information includes access control information of services with N service attributes simultaneously corresponding to each of R PLMNs and each of H non-public networks, where R and H are integers greater than or equal to 1. On a same PLMN, different non-public networks can be corresponding to different pieces of access control information. After receiving the first information, the terminal device determines, based on the first service that currently needs to be initiated, the RPLMN of the terminal device, the non-public network that the terminal device currently accesses, and the first information, whether the terminal device can initiate the first service.

The PLMN may be identified by using a PLMN ID, and the non-public network may be identified by using a non-public network identifier (for example, a CAG ID or an NPN ID). If the PLMN ID indicates a public network, and there is no CAG ID, it indicates that a network that the terminal device accesses is the public network. If the PLMN ID indicates a public network, and there is a CAG ID, it indicates that a network that the terminal device accesses is a non-stand-alone non-public network. If the PLMN ID indicates a non-public network, and there is an NPN ID, it indicates that a network that the terminal device accesses is a stand-alone non-public network.

In this embodiment, if the terminal device currently accesses the non-public network, it indicates that both the RPLMN of the terminal device and the non-public network that the terminal device currently accesses exist. The RPLMN may be indicated by using a corresponding PLMN ID, and the non-public network that the terminal device currently accesses may be indicated by using a non-public network identifier, for example, a CAG ID or an NPN ID. In an implementation, the terminal device may obtain, from R PLMNs based on the RPLMN of the terminal device, access control information of services with N service attributes corresponding to the RPLMN and access control information of services with N service attributes corresponding to H non-public networks. Then, based on the non-public network that the terminal device currently accesses, the terminal device may determine, from the access control information of the services with the N service attributes corresponding to the RPLMN and the access control information of the services with the N service attributes corresponding to the H non-public networks, access control information of services with N service attributes corresponding to the non-public network that the terminal device currently accesses. Then, the terminal device determines, based on the determined access control information of the services with the N service attributes and the first service, whether the terminal device can access the first service.

The first information in this embodiment may include the following:

```
uac-BarringPerPLMN-List
    perPLMN
        PLMN IDindex
        uac-BarringPerCAGorNPN-List
            perCAGorNPN
                CAGorNPNID index
                    UAC-ACBarringListType(Choice)
                        uac-BarrringPerCatList
                            AccessCategory
                                uac-barringInfoSetIndex
UAC-BarringInfoSetList
    UAC-BarringInfoSet
        Access percentage uac-BarringFactor
        Barring time uac-BarringTime
        Access identity uac-BarringForAccessIdentity
```

It should be noted that, if the terminal device currently accesses the public network, it indicates that the terminal device is located on only the RPLMN of the terminal device. Therefore, for a PLMN that belongs to the public network, in this embodiment, access control information of a service with a service attribute corresponding to both the PLMN and access control information of a service with a service attribute corresponding to the non-public network may not be configured. In other words, the first information may not include the access control information of the service with the service attribute corresponding to the PLMN. The network device may send other information to the terminal device, where the other information includes access control information of services with N service attributes corresponding to each of a plurality of public network PLMNs.

Therefore, according to the foregoing solutions, access control on the terminal device may be implemented when there is a non-public network service.

In some embodiments, before S603, S703, or S803, the terminal device further receives second information sent by the network device, where the second information is used to indicate whether the services with the N service attributes are supported by the network device. Correspondingly, when the second information indicates that the first service is supported by the network device, the terminal device performs S603, S703, or S803.

In this embodiment, the network device sends the second information to the terminal device. The second information is used to indicate whether the services with the N service attributes are supported by the network device. For example, the second information may indicate a specific service that is in the services with the N service attributes and that is supported by the network device, or may indicate a specific service that is in the services with the N service attributes and that is not supported by the network device. Correspondingly, the terminal device receives the second information sent by the network device. After the terminal device receives the first information and the second information, if the terminal device currently needs to initiate the first service, when the terminal device determines, based on the second information, that the first service is supported by the network device, the terminal device performs S603, S703, or S803; or when the terminal device determines, based on the second information, that the first service is not supported by the network device, the terminal device determines that the terminal device cannot initiate the first service.

In a possible implementation, the second information and the first information are different information. In the second information, for example, 0 or 1 may be used to indicate whether the network device supports the services with the N service attributes. The network device may send a system message including the second information to the terminal device. The second information and the first information may be included in a same message sent by the network device to the terminal device, or may be included in different messages sent by the network device to the terminal device.

In another possible implementation, the second information and the first information are same information. An access percentage in the first information is used to indicate whether the network device supports the services with the N service attributes. If an access percentage corresponding to a service with a service attribute is 0, it indicates that the network device does not support the service with the service attribute; or if an access percentage corresponding to a service with a service attribute is not 0, it indicates that the network device supports the service with the service attribute.

It may be understood that, in the foregoing embodiments, operations and steps that are implemented by the network device may alternatively be implemented by a component (for example, a chip or a circuit) that can be used in the network device. This is not limited in the embodiments of this application.

Figure 9:
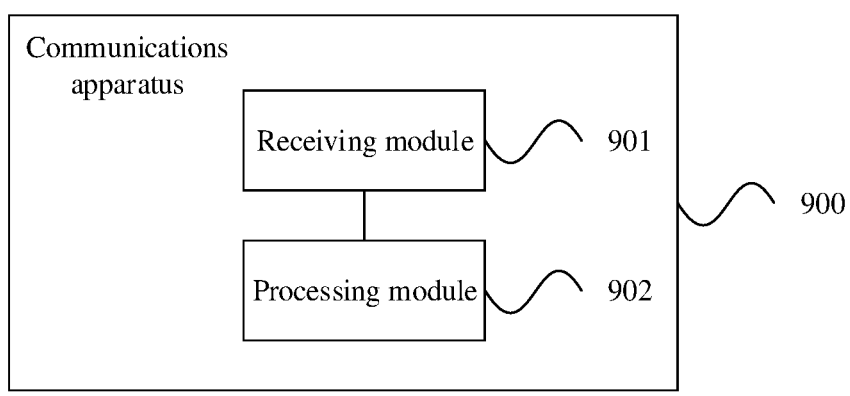
FIG. 9 is a schematic structural diagram of a communications apparatus according to an embodiment of this application.

FIG. 9 is a schematic structural diagram of a communications apparatus according to an embodiment of this application. As shown in FIG. 9, the communications apparatus may be a terminal device, or may be a component (for example, an integrated circuit or a chip) in the terminal device, or may be another communications module, to implement the operations corresponding to the terminal device in the method embodiments shown in FIG. 6 to FIG. 8. The communications apparatus 900 in this embodiment includes a receiving module 901 and a processing module 902.

The receiving module 901 is configured to receive first information sent by a network device, where the first information includes access control information of services with N service attributes, and N is an integer greater than or equal to 1.

The processing module 902 is configured to determine, based on a first service that currently needs to be initiated and the first information, whether the terminal device can initiate the first service.

The N service attributes include at least a non-public network service.

The first service is any one of the services with the N service attributes.

Optionally, the non-public network service includes at least one of the following: a non-public network service transmitted through a non-public network and a non-public network service transmitted through a public network.

Optionally, the non-public network service transmitted through the non-public network includes K access categories of non-public network services transmitted through the non-public network, where K is an integer greater than or equal to 1.

Optionally, the N service attributes further include at least one of the following: a public network service and a cross-network service.

Optionally, the public network service includes at least one of the following: a public network service transmitted through the public network and a public network service transmitted through the non-public network.

Optionally, the public network service transmitted through the public network includes M access categories of public network services transmitted through the public network, where M is an integer greater than or equal to 1.

Optionally, the cross-network service is a non-public network service transmitted through the public network or a public network service transmitted through the non-public network.

Optionally, the first information includes access control information of services with N service attributes corresponding to each of R PLMNs, where R is an integer greater than or equal to 1.

The processing module 902 is specifically configured to determine, based on the first service that currently needs to be initiated, an RPLMN of the terminal device, and the first information, whether the terminal device can initiate the first service.

Optionally, the first information includes access control information of services with N service attributes corresponding to each of R PLMNs and access control information of services with N service attributes corresponding to each of H non-public networks, where R and H are integers greater than or equal to 1.

The processing module 902 is specifically configured to: determine, based on the first service that currently needs to be initiated, an RPLMN of the terminal device, and the first information, whether the terminal device can initiate the first service; and/or determine, based on the first service that currently needs to be initiated, a non-public network that the terminal device currently accesses, and the first information, whether the terminal device can initiate the first service.

Optionally, the first information includes access control information of services with N service attributes simultaneously corresponding to each of R PLMNs and each of H non-public networks, where R and H are integers greater than or equal to 1.

The processing module 902 is specifically configured to determine, based on the first service that currently needs to be initiated, the RPLMN of the terminal device, the non-public network currently accessed by the terminal device, and the first information, whether the terminal device can initiate the first service.

Optionally, before the processing module 902 determines, based on the first service that currently needs to be initiated and the first information, whether the terminal device initiates the first service, the receiving module 901 is further configured to receive second information sent by the network device, where the second information is used to indicate whether the services with the N service attributes are supported by the network device.

The processing module 902 is specifically configured to: when the second information indicates that the first service is supported by the network device, determine, based on the first service that currently needs to be initiated and the first information, whether the terminal device can initiate the first service.

Optionally, the processing module 902 is further configured to: when the second information indicates that the first service is not supported by the network device, determine that the terminal device cannot initiate the first service.

Optionally, the access control information includes an access percentage of the terminal device and barring time of the terminal device.

The communications apparatus in this embodiment may be configured to execute the technical solutions of the terminal device in the foregoing method embodiment. Implementation principles and technical effects thereof are similar, and details are not described herein again.

Figure 10:
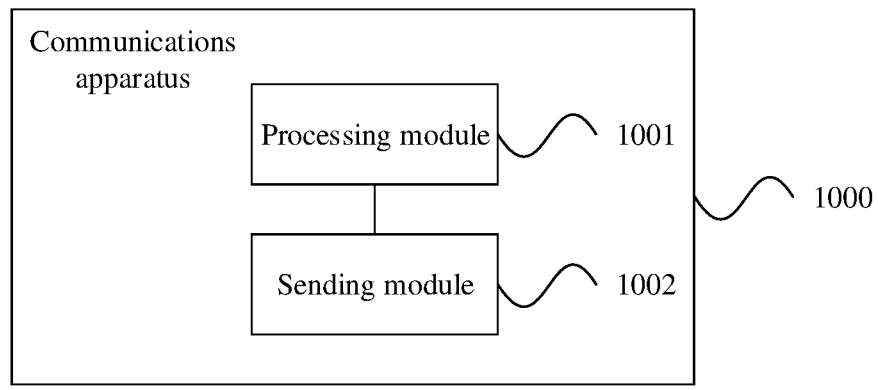
FIG. 10 is a schematic structural diagram of a communications apparatus according to another embodiment of this application.

FIG. 10 is a schematic structural diagram of a communications apparatus according to another embodiment of this application. As shown in FIG. 10, the communications apparatus may be a network device, or may be a component (for example, an integrated circuit or a chip) of the network device, or may be another communications module, to implement operations corresponding to the network device in the method embodiments shown in FIG. 6 to FIG. 8. The communications apparatus 1000 in this embodiment includes: a processing module 1001, and a sending module 1002.

The processing module 1001 is configured to generate first information, where the first information includes access control information of services with N service attributes, and N is an integer greater than or equal to 1.

The sending module 1002 is configured to send the first information to a terminal device, where the N service attributes include at least a non-public network service.

Optionally, the non-public network service includes at least one of the following: a non-public network service transmitted through a non-public network and a non-public network service transmitted through a public network.

Optionally, the non-public network service transmitted through the non-public network includes K access categories of non-public network services transmitted through the non-public network, where K is an integer greater than or equal to 1.

Optionally, the N service attributes further include at least one of the following: a public network service and a cross-network service.

Optionally, the public network service includes at least one of the following: a public network service transmitted through the public network and a public network service transmitted through the non-public network.

Optionally, the public network service transmitted through the public network includes M access categories of public network services transmitted through the public network, where M is an integer greater than or equal to 1.

Optionally, the cross-network service is a non-public network service transmitted through the public network or a public network service transmitted through the non-public network.

Optionally, the first information includes access control information of services with N service attributes corresponding to each of R public land mobile network PLMNs, where R is an integer greater than or equal to 1.

Optionally, the first information includes access control information of services with N service attributes corresponding to each of R PLMNs and access control information of services with N service attributes corresponding to each of H non-public networks, where R and H are integers greater than or equal to 1.

Optionally, the first information includes access control information of services with N service attributes simultaneously corresponding to each of R PLMNs and each of H non-public networks, where R and H are integers greater than or equal to 1.

Optionally, the sending module 1002 is further configured to send second information to the terminal device, where the second information is used to indicate whether the services with the N service attributes are supported by the network device.

Optionally, the access control information includes an access percentage of the terminal device, barring time of the terminal device, and an access identity of the terminal device.

The communications apparatus in this embodiment may be configured to execute the technical solutions of the network device in the foregoing method embodiments. Implementation principles and technical effects thereof are similar, and details are not described herein again.

Figure 11:
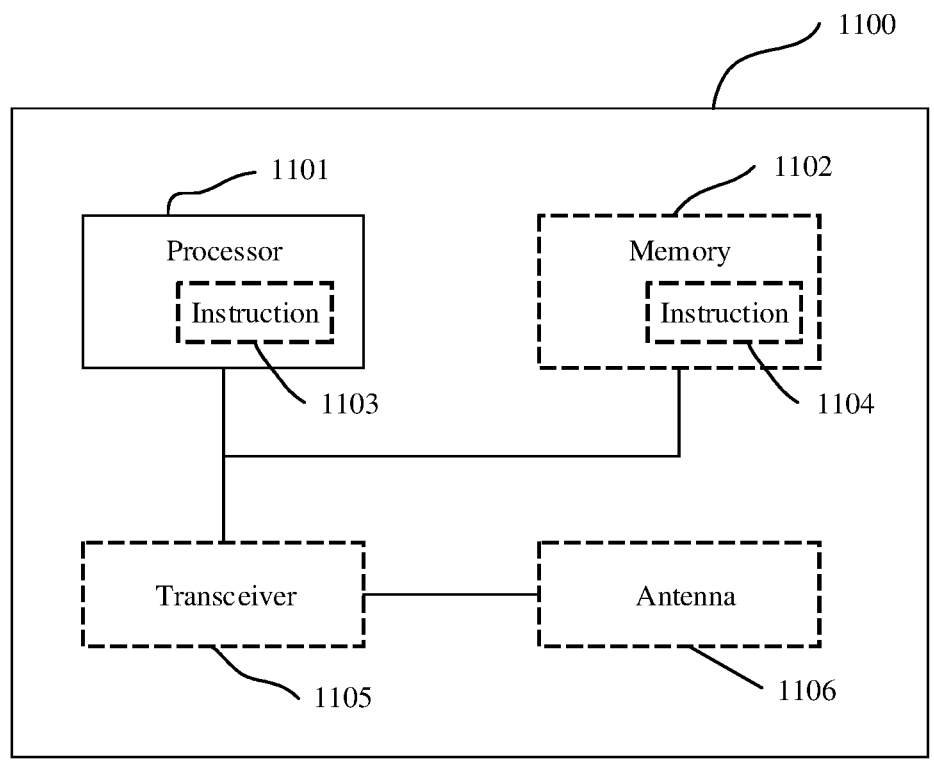
FIG. 11 is a schematic structural diagram of a communications apparatus according to another embodiment of this application.

FIG. 11 is a schematic structural diagram of a communications apparatus according to another embodiment of this application. As shown in FIG. 11, the communications apparatus 1100 in this embodiment may be the terminal device (or a component that can be used in the terminal device) or the network device (or a component that can be used in the network device) mentioned in the foregoing method embodiments. The communications apparatus may be configured to implement the method that is corresponding to the terminal device or the network device and that is described in the foregoing method embodiments. For details, refer to the descriptions in the foregoing method embodiments.

The communications apparatus 1100 may include one or more processors 1101. The processor 1101 may also be referred to as a processing unit, and may implement a specific control or processing function. The processor 1101 may be a general-purpose processor, a special-purpose processor, or the like. For example, the processor 1101 may be a baseband processor or a central processing unit. The baseband processor may be configured to process a communication protocol and communication data. The central processing unit may be configured to: control the communications apparatus, execute a software program, and process data of the software program.

In an optional design, the processor 1101 may also store an instruction 1103 or data (for example, intermediate data). The instruction 1103 may be run by the processor, so that the communications apparatus 1100 performs the method that is corresponding to the terminal device or the network device and that is described in the foregoing method embodiments.

In another possible design, the communications apparatus 1100 may include a circuit. The circuit may implement a sending, receiving, or communication function in the foregoing method embodiments.

Optionally, the communications apparatus 1100 may include one or more memories 1102. The memory 1102 may store an instruction 1104, and the instruction may be run on the processor, so that the communications apparatus 1100 performs the method described in the foregoing method embodiments.

Optionally, the memory may also store data. The processor and the memory may be separately disposed, or may be integrated together.

Optionally, the communications apparatus 1100 may further include a transceiver 1105 and/or an antenna 1106. The processor 1101 may be referred to as a processing unit, and controls the communications apparatus (a first network device or a second network device). The transceiver 1105 may be referred to as a transceiver unit, a transceiver machine, a transceiver circuit, a transceiver, or the like, and is configured to implement a transceiver function of the communications apparatus.

In a design, if the communications apparatus 1100 is configured to implement an operation that is corresponding to the terminal device in the foregoing embodiments. For example, the transceiver 1105 may receive first information sent by the network device, where the first information includes access control information of services with N service attributes, where N is an integer greater than or equal to 1. The processor 1101 determines, based on a first service that currently needs to be initiated and the first information, whether the terminal device can initiate the first service, where the N service attributes include at least a non-public network service, and the first service is any one of the services with the N service attributes.

For specific implementation processes of the transceiver 1105 and the processor 1101, refer to the related descriptions in the foregoing embodiments. Details are not described herein again.

In another design, if the communications apparatus is configured to implement an operation that is corresponding to the network device in the foregoing embodiments. For example, the processor 1101 may generate first information, where the first information includes access control information of services with N service attributes, and N is an integer greater than or equal to 1. The transceiver 1105 sends the first information to a terminal device, where the N service attributes include at least a non-public network service.

For specific implementation processes of the processor 1101 and the transceiver 1105, refer to the related descriptions in the foregoing embodiments. Details are not described herein again.

The processor 1101 and the transceiver 1105 described in this application may be implemented on an integrated circuit (IC), an analog IC, a radio frequency integrated circuit (RFIC), a hybrid signal IC, an application-specific integrated circuit (application specific integrated circuit, ASIC), a printed circuit board (PCB), an electronic device, or the like. The processor and the transceiver may also be manufactured by using various 1C technologies, for example, a complementary metal oxide semiconductor (CMOS), an n-type metal oxide semiconductor (nMetal-oxide-semiconductor, NMOS), a p-type metal oxide semiconductor (positive channel metal oxide semiconductor, PMOS), a bipolar junction transistor (BJT), a bipolar CMOS (BiCMOS), silicon germanium (SiGe), and gallium arsenide (GaAs).

Although the communications apparatus 1100 is described by using the terminal device or the network device as an example in the foregoing embodiment descriptions, a scope of the communications apparatus described in this application is not limited to the foregoing terminal device or network device, and a structure of the communications apparatus may not be limited by FIG. 11. The communications apparatus 1100 may be an independent device or may be a part of a relatively large device. For example, the device may be:

(1) an independent integrated circuit IC, a chip, a chip system, or a subsystem;
(2) a set including one or more ICs, where optionally, the IC set may further include a storage component configured to store data and/or an instruction;
(3) an ASIC, for example, a modem (MSM);
(4) a module that can be embedded in another device;
(5) a receiver, a wireless device, a mobile unit, a network device, and the like; or
(6) other devices.

Figure 12:
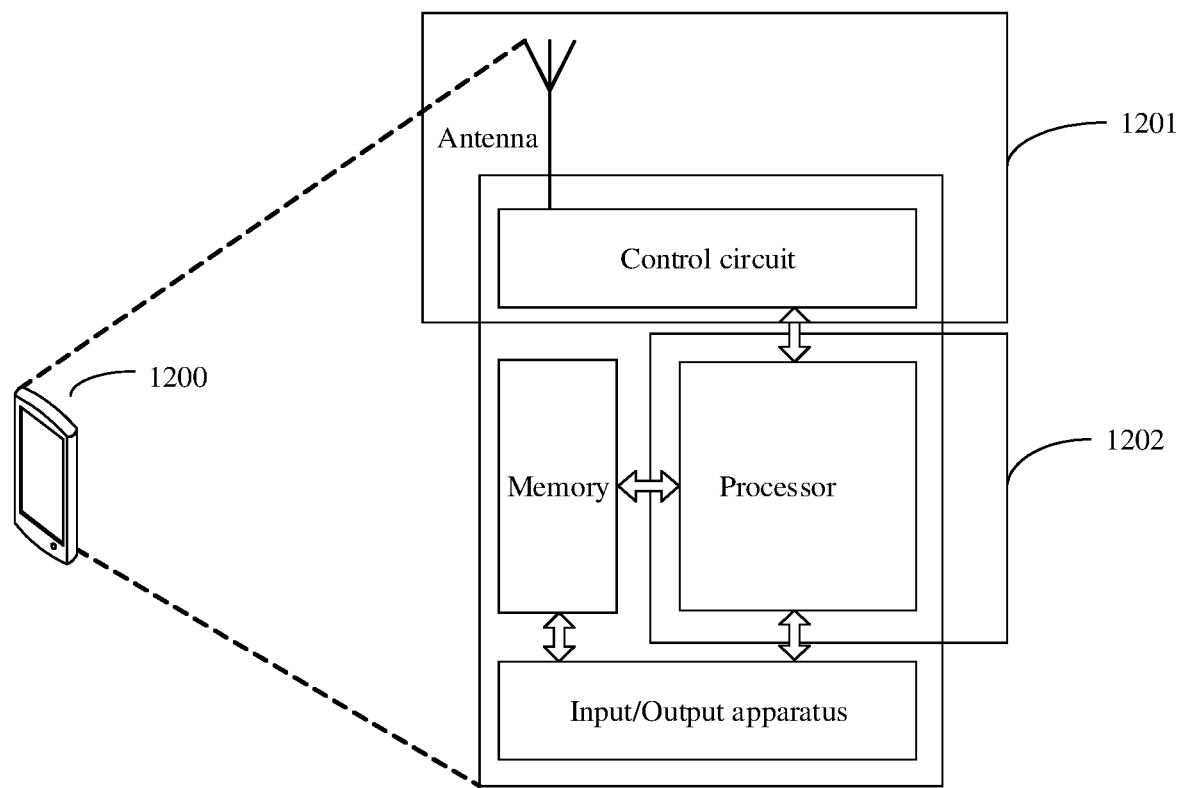
FIG. 12 is a schematic structural diagram of a terminal device according to an embodiment of this application.

FIG. 12 is a schematic structural diagram of a terminal device according to an embodiment of this application. The terminal device is applicable to the terminal device described in the foregoing embodiments of this application. For ease of description, FIG. 12 shows only main components of the terminal device. As shown in FIG. 12, the terminal device 1200 includes a processor, a memory, a control circuit, an antenna, and an input/output apparatus. The processor is mainly configured to: process a communication protocol and communication data, control the entire terminal, execute a software program, process data of the software program, and the like. The memory is mainly configured to store the software program and data. A radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus such as a touchscreen, a display, or a keyboard is mainly configured to: receive data that is input by a user, and output data to the user.

After the terminal device is powered on, the processor may read the software program in a storage unit, explain and execute an instruction of the software program, and process the data of the software program. When data needs to be sent in a wireless manner, after the processor performs baseband processing on the to-be-sent data, the processor outputs a baseband signal to the radio frequency circuit. After performing radio frequency processing on the baseband signal, the radio frequency circuit sends a radio frequency signal through an antenna in a form of an electromagnetic wave. When data is sent to the terminal, the radio frequency circuit receives the radio frequency signal through the antenna, converts the radio frequency signal into the baseband signal, and outputs the baseband signal to the processor. The processor converts the baseband signal into data, and processes the data.

A person skilled in the art may understand that for ease of description, FIG. 12 shows only one memory and only one processor. An actual terminal may include a plurality of processors and a plurality of memories. The memory may also be referred to as a storage medium, a storage device, or the like. This is not limited in the embodiments of this application.

In an optional implementation, the processor may include a baseband processor and a central processing unit. The baseband processor is mainly configured to process the communication protocol and the communication data. The central processing unit is mainly configured to: control the entire terminal, execute the software program, and process the data of the software program. The processor in FIG. 12 integrates functions of the baseband processor and the central processing unit. A person skilled in the art may understand that, alternatively, the baseband processor and the central processing unit may be independent processors, and interconnected by using a technology such as a bus. The person skilled in the art may understand that the terminal device may include a plurality of baseband processors to adapt to different network standards, the terminal device may include a plurality of central processing units to improve a processing capability of the terminal device, and components of the terminal device may be connected by using various buses. The baseband processor may alternatively be expressed as a baseband processing circuit or a baseband processing chip. The central processing unit may alternatively be expressed as a central processing circuit or a central processing chip. A function of processing the communication protocol and the communication data may be built in the processor, or may be stored in the storage unit in a form of a software program. The processor executes the software program to implement a baseband processing function.

In an example, the antenna having a transceiver function and the control circuit may be considered as a transceiver module 1201 of the terminal device 1200, and the processor having a processing function may be considered as a processing module 1202 of the terminal device 1200. As shown in FIG. 12, the terminal device 1200 includes the transceiver module 1201 and the processing module 1202. The transceiver module may also be referred to as a transceiver, a transceiver machine, a transceiver apparatus, or the like. Optionally, a component that is in the transceiver module 1201 and that is configured to implement a receiving function may be considered as a receiving module, and a component that is in the transceiver module 1201 and that is configured to implement a sending function may be considered as a sending module. In other words, the transceiver module 1201 includes the receiving module and the sending module. For example, the receiving module may also be referred to as a receiver machine, a receiver, a receiver circuit, or the like. The sending module may be referred to as a transmitter machine, a transmitter, a transmitter circuit, or the like.

Figure 13:
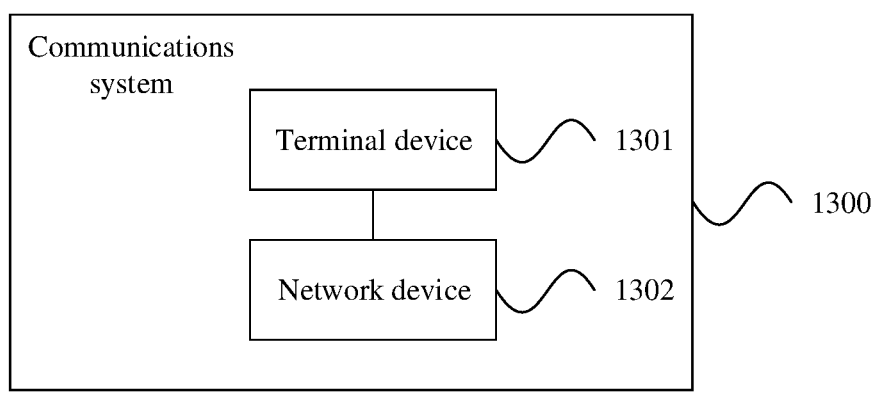
FIG. 13 is a schematic structural diagram of a communications system according to an embodiment of this application.

FIG. 13 is a schematic structural diagram of a communications system according to an embodiment of this application. As shown in FIG. 13, the communications system 1300 in this embodiment may include a terminal device 1301 and a network device 1302. There may be one or more terminal devices 1301. The terminal device 1301 may use a structure in the apparatus embodiment shown in FIG. 9, FIG. 11, or FIG. 12, and may correspondingly perform the technical solution of the terminal device in any one of the foregoing method embodiments. Implementation principles and technical effects thereof are similar, and details are not described herein again. The network device 1302 may use a structure of the apparatus embodiment shown in FIG. 10 or FIG. 11, and may correspondingly perform the technical solution of the network device in any one of the foregoing method embodiments. Implementation principles and technical effects thereof are similar, and details are not described herein again.

It should be noted that in the embodiments of this application, module division is an example, and is merely logical function division. There may be another division manner during actual implementation. Function modules in the embodiments of this application may be integrated into one processing module, or each module may exist alone physically, or two or more modules may be integrated into one module. The integrated module may be implemented in a form of hardware, or may be implemented in a form of a software function module.

When the integrated module is implemented in the form of a software function module and sold or used as an independent product, the integrated module may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods in the embodiments of this application. The foregoing storage medium includes: any medium that can store program code, such as a USB flash drive, a removable hard disk, a read-only memory (ROM), a random access memory (RAM), a magnetic disk, or an optical disc.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. A communications method, comprising:
   receiving, by a terminal device, first information sent by a network device, wherein the first information comprises access control information of at least one service of a public network and at least one service of a non-public network, and the first information further comprises a first index of the public network, a second index of the non-public network, an access category of each service of the at least one service of the public network, and an access category of each service of the at least one service of the non-public network, and wherein the first index is a number uniquely identifying the public network, the second index is a number uniquely identifying the non-public network, and each access category has a preset association with a condition related to terminal devices and a type of allowed access attempt; and
   determining, by the terminal device based on a first service that is to be initiated and the first information, whether the terminal device is allowed to initiate the first service, wherein the first service is a service of the at least one service of the public network or the at least one service of the non-public network.

2. The method according to claim 1, wherein determining, by the terminal device based on the first service that is to be initiated and the first information, whether the terminal device is allowed to initiate the first service comprises:
   determining, by the terminal device, whether the terminal device is allowed to initiate the first service based on the first information, the first service that is to be initiated, and a registered public land mobile network (RPLMN) of the terminal device.

3. The method according to claim 1,
wherein determining, by the terminal device based on the first service that is to be initiated and the first information, whether the terminal device is allowed to initiate the first service comprises:
determining, by the terminal device, whether the terminal device is allowed to initiate the first service based on the first information, the first service that is to be initiated, and a non-public network that the terminal device currently accesses.

4. The method according to claim 1, wherein the access control information comprises an access percentage of the terminal device and barring time of the terminal device.

5. The method according to claim 1, wherein the at least one service of the non-public network comprises at least one of the following: a non-public network service transmitted through a non-public network, or a non-public network service transmitted through a public network.

6. The method according to claim 5, wherein the non-public network service transmitted through the non-public network comprises K access categories of non-public network services transmitted through the non-public network, wherein K is an integer greater than or equal to 1.

7. The method according to claim 1, wherein the at least one service of the public network or the at least one service of the non-public network comprises a cross-network service.

8. A communications apparatus, comprising:
a receiving circuit, configured to receive first information sent by a network device, wherein the first information comprises access control information of at least one service of a public network and at least one service of a non-public network, and the first information further comprises a first index of the public network, a second index of the non-public network, an access category of each service of the at least one service of the public network, and an access category of each service of the at least one service of the non-public network, and wherein the first index is a number uniquely identifying the public network, the second index is a number uniquely identifying the non-public network, and each access category has a preset association with a condition related to terminal devices and a type of allowed access attempt; and
a processor, configured to determine, based on a first service that is to be initiated and the first information, whether the communications apparatus is allowed to initiate the first service, wherein the first service is a service of the at least one service of the public network or the at least one service of the non-public network.

9. The communications apparatus according to claim 8, wherein the processor is further configured to determine whether the communications apparatus is allowed to initiate the first service based on the first information, the first service that is to be initiated, and a registered public land mobile network (RPLMN) of the communications apparatus.

10. The communications apparatus according to claim 8, wherein the processor is further configured to:
determine whether the communications apparatus is allowed to initiate the first service, based on the first information, the first service that is to be initiated, and a non-public network in H non-public networks that the communications apparatus currently accesses.

11. The communications apparatus according to claim 8, wherein the access control information comprises an access percentage of the communications apparatus and barring time of the communications apparatus.

12. The communications apparatus according to claim 8, wherein the at least one service of the non-public network comprises at least one of the following: a non-public network service transmitted through a non-public network, or a non-public network service transmitted through a public network.

13. The communications apparatus according to claim 12, wherein the non-public network service transmitted through the non-public network comprises K access categories of non-public network services transmitted through the non-public network, wherein K is an integer greater than or equal to 1.

14. The communications apparatus according to claim 8, wherein the at least one service of the public network or the at least one service of the non-public network comprises a cross-network service.

15. A communications apparatus, comprising:
a processor, configured to generate first information, wherein the first information comprises access control information of at least one service of a public network and at least one service of a non-public network, and the first information comprises a first index of the public network, a second index of the non-public network, an access category of each service of the at least one service of the public network, and an access category of each service of the at least one service of the non-public network, and wherein the first index is a number uniquely identifying the public network, the second index is a number uniquely identifying the non-public network, and each access category has a preset association with a condition related to terminal devices and a type of allowed access attempt; and
a sending circuit, configured to send the first information to a terminal device, wherein the first information enables the terminal device to determine whether the terminal device is allowed to initiate a first service, and the first service is a service of the at least one service of the public network or the at least one service of the non-public network.

16. The communications apparatus according to claim 15, wherein the at least one service of the non-public network comprises at least one of the following: a non-public network service transmitted through a non-public network, or a non-public network service transmitted through a public network.

17. The communications apparatus according to claim 16, wherein the non-public network service transmitted through the non-public network comprises K access categories of non-public network services transmitted through the non-public network, wherein K is an integer greater than or equal to 1.

18. The communications apparatus according to claim 15, wherein the at least one service of the public network or the at least one service of the non-public network comprises a cross-network service.

19. The communications apparatus according to claim 18, wherein the at least one service of the public network comprises at least one of the following: a public network service transmitted through a public network and a public network service transmitted through a non-public network.

20. The communications apparatus according to claim 15, wherein the access control information comprises an access percentage of the terminal device and barring time of the terminal device.

* * * * *